United States Patent
Jang et al.

(10) Patent No.: US 11,086,933 B2
(45) Date of Patent: Aug. 10, 2021

(54) EVENT SEARCH SYSTEM, DEVICE, AND METHOD

(71) Applicant: HANWHA TECHWIN CO., LTD., Seongnam-si (KR)

(72) Inventors: Se Mi Jang, Seongnam-si (KR); Jeong Eun Lim, Seongnam-si (KR); Seung In Noh, Seongnam-si (KR)

(73) Assignee: HANWHA TECHWIN CO., LTD.

( * ) Notice: Subject to any disclaimer, the term of this patent is extended or adjusted under 35 U.S.C. 154(b) by 112 days.

(21) Appl. No.: 16/313,877

(22) PCT Filed: Aug. 31, 2016

(86) PCT No.: PCT/KR2016/009698
§ 371 (c)(1),
(2) Date: Dec. 27, 2018

(87) PCT Pub. No.: WO2018/034377
PCT Pub. Date: Feb. 22, 2018

(65) Prior Publication Data
US 2019/0146996 A1    May 16, 2019

(30) Foreign Application Priority Data
Aug. 18, 2016  (KR) .......................... 10-2016-0104593

(51) Int. Cl.
*G06F 16/732*  (2019.01)
*G06F 16/74*  (2019.01)
(Continued)

(52) U.S. Cl.
CPC .......... *G06F 16/7335* (2019.01); *G06F 16/74* (2019.01); *G06F 16/7837* (2019.01); *H04N 7/183* (2013.01); *H04N 7/188* (2013.01)

(58) Field of Classification Search
CPC .. G06F 16/7335; G06F 16/74; G06F 16/7837; H04M 1/725; H04N 7/183; H04N 7/188
See application file for complete search history.

(56) References Cited

U.S. PATENT DOCUMENTS

2007/0248244 A1   10/2007  Sato et al.
2009/0265747 A1*  10/2009  Li ..................... H04N 21/4753
                                                    725/109
(Continued)

FOREIGN PATENT DOCUMENTS

KR    10-2012-0113014    10/2012
KR    10-2012-0130936    12/2012
KR    10-2014-0141025    12/2014

OTHER PUBLICATIONS

International Search Report dated Jun. 1, 2017, issued in International Application No. PCT/KR2016/009693.

*Primary Examiner* — Jay A Morrison
(74) *Attorney, Agent, or Firm* — H.C. Park & Associates, PLC

(57) ABSTRACT

An event search device includes: a first communication unit configured to receive, from a camera, a plurality of image frames of a surveillance area generated in response to an occurrence of an event; and metadata including time information of the occurrence of the event and location information of an event in the image frames; a user interface configured to receive a search condition for searching for the event, the search condition including an event search area; a screen unit configured to display the event search area on the image frames; and a control unit configured to search for an event satisfying the search condition within the event search area by using the metadata, wherein at least one of a location, a size, and a shape of the event search area is defined through the user interface.

20 Claims, 20 Drawing Sheets

(51) Int. Cl.
*G06F 16/783* (2019.01)
*H04N 7/18* (2006.01)

(56) References Cited

U.S. PATENT DOCUMENTS

| | | | |
|---|---|---|---|
| 2010/0094548 A1* | 4/2010 | Tadman | G06Q 50/16 |
| | | | 701/533 |
| 2010/0123830 A1* | 5/2010 | Vunic | H04N 21/4394 |
| | | | 348/700 |
| 2012/0173577 A1 | 7/2012 | Millar et al. | |
| 2012/0300081 A1 | 11/2012 | Kim | |
| 2013/0182893 A1* | 7/2013 | Lavender | G06K 9/00771 |
| | | | 382/103 |
| 2014/0205148 A1* | 7/2014 | Hirano | H04N 5/76 |
| | | | 382/103 |
| 2014/0355823 A1* | 12/2014 | Kwon | G06K 9/00711 |
| | | | 382/103 |

* cited by examiner

```
ff->utc = 1457338735;
ff->event.type = 1;
ff->numObj = 1;
ff->obj[0].objID = 2;
ff->obj[0].left = -0.188661;
ff->obj[0].right = -0.112414;
ff->obj[0].top = -0.228162;
ff->obj[0].bottom = -0.074316;
```

EVENT SEARCH SYSTEM, DEVICE, AND METHOD

CROSS-REFERENCE TO RELATED APPLICATIONS

This application is a National Stage Entry of International Application No. PCT/KR2016/009698, filed on Aug. 31, 2016, and claims priority from and the benefit of Korean Patent Application No. 10-2016-0104593, filed on Aug. 18, 2016, which are hereby incorporated by reference for all purposes as if fully set forth herein.

BACKGROUND

Field

Exemplary embodiments of the invention relate generally to an event search system, device, and method, and more specifically, to an event system, device, and method capable of deriving only events that have occurred within a search area as a search result by a user specifying an area intended to be searched as the search area after an event occurs.

Discussion of the Background

Generally, surveillance systems are being widely used in a variety of locations including banks, department stores, and general residential areas. Such a surveillance system may be used for the purpose of crime prevention, security, or the like, but recently is also used to surveil a pet or a child indoors in real time. Also, a system that is most widely used as such a surveillance system is a closed circuit television (CCTV) system, in which a camera is installed at an appropriate location to capture an image of an area which a user desires to be under surveillance, after which the user may surveil the area by monitoring the image captured by the camera.

Recently, such CCTV systems provide an event search function. An event refers to a number of various events that occur while a camera is capturing a specific area. For example, such events include a motion event in which a person or animal moves, a motion and sound event in which a glass falls from a cupboard and then breaks, a heat and light event in which a fire occurs, and the like. Recently, CCTVs are connected to various sensors to provide an event notification function in which, when a specific event occurs, the sensors detect the event and inform a user that the event has occurred.

However, when an event has already occurred, a user may hope to check details of the event having occurred. As an example, it is assumed that a vase is broken in a living room when a user comes back home. In this case, the user may wish to monitor which events have occurred in the past. However, conventionally, in order to search for such an event, a user could enter only a time condition.

Alternatively, even when a location condition is allowed to be entered, a user cannot enter the location condition after an event has occurred. That is, when a user sets an area of interest (ROI) in advance, later, the user can only search for an event having occurred in the ROI. Thus, later, there is a need to enter a location condition as one search condition in order to search for an event having occurred in a specific area in the past.

The above information disclosed in this Background section is only for understanding of the background of the inventive concepts, and, therefore, it may contain information that does not constitute prior art.

SUMMARY

Devices and methods constructed according to exemplary implementations of the invention are capable of providing an event search, device, and method capable of deriving only an event having occurred in a search area as a search result by a user specifying, as the search area, an area to be searched after an event occurs.

It should be noted that objectives of the present invention are not limited to the above-described objective, and other objectives that are not described herein will be apparent to those skilled in the art from the following descriptions.

In order to solve the problem, according to an embodiment of the present invention, an event search system includes a sensor configured to detect an event occurrence and generate a signal; a camera configured to receive the signal from the sensor and capture a surveillance area to generate a plurality of image frames and metadata for the image frames; and an event search device configured to receive the plurality of image frames and the metadata from the camera and search for an event, wherein the event search device comprises: a first communication unit configured to receive the plurality of image frames and the metadata which includes occurrence time information and location information of the event in the image frames; a user interface configured to receive an event search area as a search condition for searching for the event; a screen unit configured to display the event search area on the image frames; and a control unit configured to search for an event satisfying the search condition within the event search area by using the metadata, and wherein at least one of a location, a size, and a shape of the event search area is changeable by a user.

In order to solve the problem, according to an embodiment of the present invention, an event search device includes a first communication unit configured to receive, from a camera, a plurality of image frames acquired by capturing a surveillance area and also metadata including occurrence time information and location information of an event in the image frames; a user interface configured to receive an event search area as a search condition for searching for the event; a screen unit configured to display the event search area on the image frames; and a control unit configured to search for an event satisfying the search condition within the event search area by using the metadata, wherein at least one of a location, a size, and a shape of the event search area is changeable by a user.

In order to solve the problem, according to an embodiment of the present invention, an event search method includes capturing a surveillance area and acquiring a plurality of image frames by means of a camera; generating metadata including occurrence time information and location information of an event in the image frames by means of the camera; receiving the plurality of image frames and the metadata by means of an event search device; receiving an event search area as a search condition for searching for the event by means of the event search device; displaying the event search area on the image frames by means of a screen unit of the event search device; and searching for an event satisfying the search condition within the event search area by using the metadata by means of a control unit of the event search device.

Other specific details of the present invention are included in the detailed description and drawings.

According to the embodiments of the present invention, at least the following effect can be obtained.

By a user specifying an area to be searched as a search area even after an event occurs, it is possible to derive only an event having occurred in the search area as a search result.

Advantageous effects of the present invention are not limited to the above-description, and other various effects are included in this specification.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
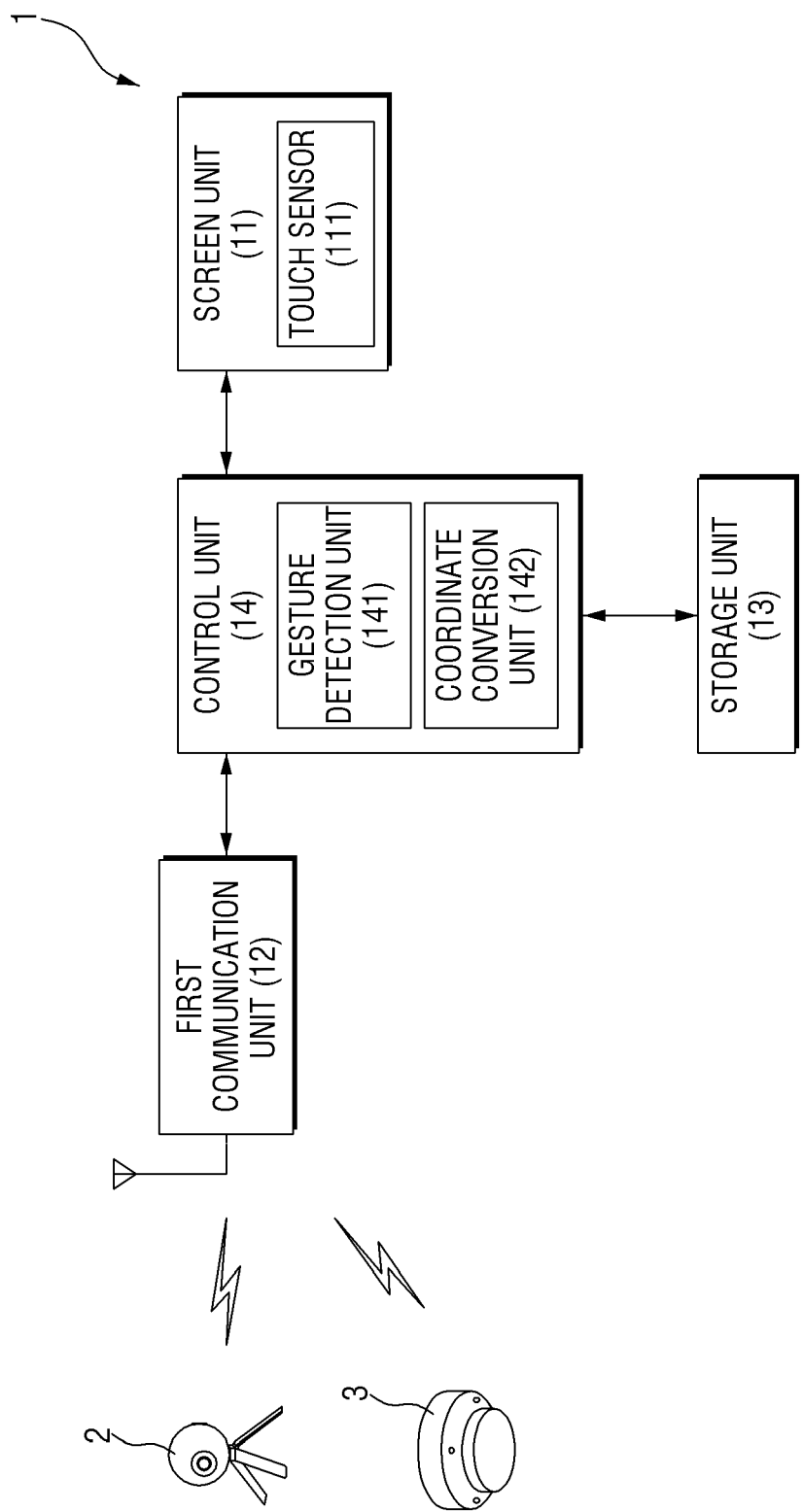
FIG. 1 is a block diagram showing a configuration of an event search system according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete and will fully convey the scope of the present invention to those skilled in the art. Like reference numerals refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. The terms "comprises" and/or "comprising" used herein specify the presence of stated elements, but do not preclude the presence or addition of one or more other elements.

Hereinafter, exemplary embodiments of the present invention will be described in detail with reference to the accompanying drawings.

Figure 2:
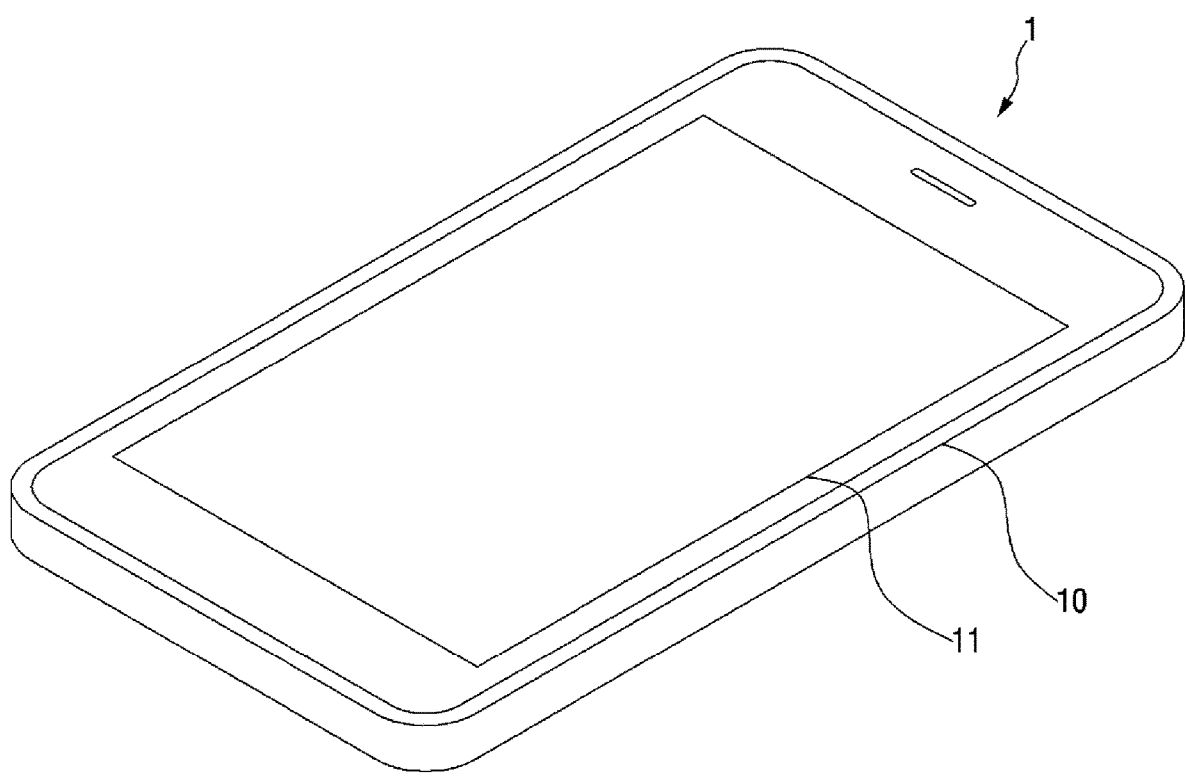
FIG. 2 is a perspective view of an event search device 1 of FIG. 1.

FIG. 1 is a block diagram showing a configuration of an event search system according to an embodiment of the present invention, and FIG. 2 is a perspective view of an event search device 1 of FIG. 1.

Based on a method using the event search system according to an embodiment of the present invention, an event search area 116 is displayed on a screen unit 11 of the event search device 1. Also, by using the event search area 116, a user may easily specify a location condition to search for an image 112 captured and stored in advance of an event or the like generated at a specific location. In this case, without directly searching for images 112 in which an event occurrence is recorded, the event search device 1 may search for only metadata in which an event has occurred by using pre-generated metadata and quickly output a search result.

The event search system according to an embodiment of the present invention includes a camera 2 configured to capture a specific area to acquire an image 112, a sensor 3 configured to transmit a signal when an event occurrence is detected, and the event search device 1, which receives and displays the image 112 acquired by the camera 2 and receives the signal transmitted from the sensor 3. The camera 2 or the sensor 3 and the event search device 1 may be connected to each other in a wired or wireless manner to transmit or receive image data or signals.

The camera 2 captures a specific area to acquire an image 112. The camera 2 according to an embodiment of the present invention may be a pan-tilt camera capable of panning and tilting. Alternatively, the camera 2 may be a 360-degree camera that is recently introduced. A 360-degree camera is a camera 2 capable of simultaneous omni-directional capturing by having a plurality of fish-eye lenses without physically panning or tilting. In this case, an image 112 acquired by a 360-degree camera is panned or tilted using software installed in the event search device 1. The camera 2 according to an embodiment of the present invention is not limited thereto, and various cameras may be used as the camera 2.

The camera 2 according to an embodiment of the present invention may be a digital camera configured to capture two-dimensional (2D) pictures at 15 to 30 frames per second, perform digital conversion on the pictures, and then output video data, but the present invention is not limited thereto. When the camera 2 is not a digital camera, a captured image is an RGB analog image signal, so an analog-to-digital (A/D) converter should be provided separately. On the other hand, when the camera 2 is a digital camera, there is no need for the A/D converter. Also, the camera 2 has an image encoding function installed therein, and thus when an image is captured, the camera 2 encodes the image immediately to generate compressed image data.

The image 112 captured by the camera 2 is transmitted to the event search device 1 through wired or wireless communication and displayed through the screen unit 11 built in the event search device 1. However, when the camera 2 is mounted on the event search device 1, the image 112 captured by the camera 2 may be transmitted to the screen unit 11 through an internal circuit, not through wireless communication, and then displayed.

The sensor 3 may detect an event. For example, the sensor 3 includes a fire detection sensor 3 for detecting occurrence of a fire, a smoke detection sensor for detecting occurrence of smoke, a heat or motion detection sensor 3 for detecting appearance of a person or animal, or the like. In addition, recently, an Internet of Things (IoT) network in which information is exchanged between distributed elements, such as objects, is being developed. The sensor 3 according to an embodiment of the present invention may be a sensor 3 that is built in an IoT-dedicated module in order to implement IoT technology. That is, the sensor 3 is not limited thereto, and various kinds of sensors 3 may be used as long as the sensors 3 detect any kinds of events.

The event search device 1 according to an embodiment of the present invention may detect an event occurrence when no sensor 3 is present. That is, when an event occurs while the camera 2 is capturing a specific area, the event occurrence is detected and analyzed through the image 112 acquired by the camera 2 even without the sensor 3. The method of detecting the event occurrence through the image 112 will be described below.

The event search device 1 receives and displays the image 112 acquired by the camera 2 and then receives a user's input and searches for an event. The event search device 1 may be a device that is portable and easy to move, such as a smartphone, a tablet PC, and a laptop, but the present invention is not limited thereto. The event search device 1 may also be a device that is not easy to move, such as a desktop and a video wall.

As shown in FIG. 1, the event search device 1 includes a main body 10, a screen unit 11 configured to display an image 112, a first communication unit 12 configured to receive image data and signals from a camera 2 and a sensor 3, a storage unit 13 configured to store the image 112, and a control unit 14 configured to control the other elements.

The screen unit 11 displays the image 112 acquired by the camera 2. The image 112 may be a real-time image 112 that is captured and acquired by the camera in real time and also may be an image 112 that has been already captured and stored in the storage unit 13 and then is loaded and displayed. Also, the screen unit 11 displays the event search area 116 so as to facilitate a search for the stored image 112 or event. When the event search device 1 provides a touch function, the screen unit 11 may include a touch sensor 111. In this case, a user may directly enter a touch signal through the screen unit 11. The touch sensor 111 may be integrated with the screen unit 11 and is configured to detect a touch generated on the screen unit 11, detect coordinates of an area where the touch is generated, the number of touches, touch strength, and the like, and deliver a result of the detection to the control unit 14. Depending on the manner in which the touch sensor 111 detects a touch, various types such as capacitive type, resistive type, ultrasonic type, and infrared type may be used. Although the event search device 1 provides a touch function, the screen unit 11 may not include the touch sensor 111. In this case, a separate touch pad may be provided as an input unit. Also, the touch may be made with a human finger, but the present invention is not limited thereto. A stylus pen equipped with a tip capable of conducting a micro current may be used. When the event search device 1 does not provide a touch function, an input unit capable of receiving a user's command, such as a mouse, may be separately provided.

The first communication unit 12 may transmit and receive signals and data to and from the camera 2 and the sensor 3 in a wired or wireless manner. For example, the first communication unit 12 modulates signals and data received from the control unit 14, performs frequency up-conversion on the signals and data, and then transmits the signals and data, or performs down-conversion on signals and data received from the camera 2 and the sensor 3, demodulates the signals and data, and provides the signals and data to the control unit 14. Through this process, the first communication unit 12 may receive an image 112 or data from the camera 2 or receive a signal of the sensor 3 and may transmit data or signals generated by the control unit 14 to the camera 2 or the sensor 3.

The storage unit 13 stores programs for processing and controlling operations of the event search device 1, various kinds of data generated while each program is being performed, and image data transmitted through the camera 2. The storage unit 13 may be built in the event search device 1. However, a separate device such as a network video recorder (NVR) may be provided for a system having a network camera 2.

The control unit 14 controls the overall operation of the event search device 1. For example, the control unit 14 performs processing and control for signal and data communication between the first communication unit 12 and the camera 2 and performs image processing, such as decoding and rendering, of images 112 when the image 112 is transmitted through the first communication unit 12. Also, the control unit 14 controls the screen unit 11 to display the event search area 116 and searches for events having occurred in the event search area 116 during a specific period when the event search area 116 is set. Also, the control unit 14 controls the storage unit 13 to store the image 112 and load the stored image 112. A central processing unit (CPU), a micro control unit (MCU), or a digital signal processor (DSP) be used as the control unit 14 according to an embodiment of the present invention, but the present invention is not limited thereto. Various logical operation processors may be used.

The control unit 14 includes a gesture detection unit 141 and a coordinate transformation unit 142. The gesture detection unit 141 detects a touch gesture from the touch sensor 111. The touch gesture includes any touch operations arising from the touch sensor 111. When the event search device 1 does not provide a touch function, a user command received through an input unit, such as a mouse, is detected. The gesture detection unit 141 manages the touch sensor 111 and includes an application program interface (API) for a user to easily use a touch gesture in an application. An API refers to an interface for controlling a function that is provided by an operating system or a programming language so that the function may be used in an application program. Though the API, the gesture detection unit 141 receives a user command for executing an application for controlling the camera 2 and a user command for controlling an activated application.

The coordinate transformation unit 142 receives coordinates at which a user command is entered from the gesture detection unit 141 and generates a location change value of the event search area 116 on the basis of the coordinates. When a user touches one joint 1161 of the event search area 116 in order to specify the location condition, the coordinates of the joints 1161 are extracted. Then, when the user drags the joint 1161, coordinates along a path of the dragging are extracted at every cycle or interval. The coordinate transformation unit 142 may recognize a direction and distance in which the dragging is made through the extracted coordinates and may transform the direction and distance into a value to which the location of the joint 1161 should be changed. By changing the location of the joint 1161 by using the value and then displaying the joint 1161 through the screen unit 11, it is possible to specify the location condition according to the user's command.

Figure 3:
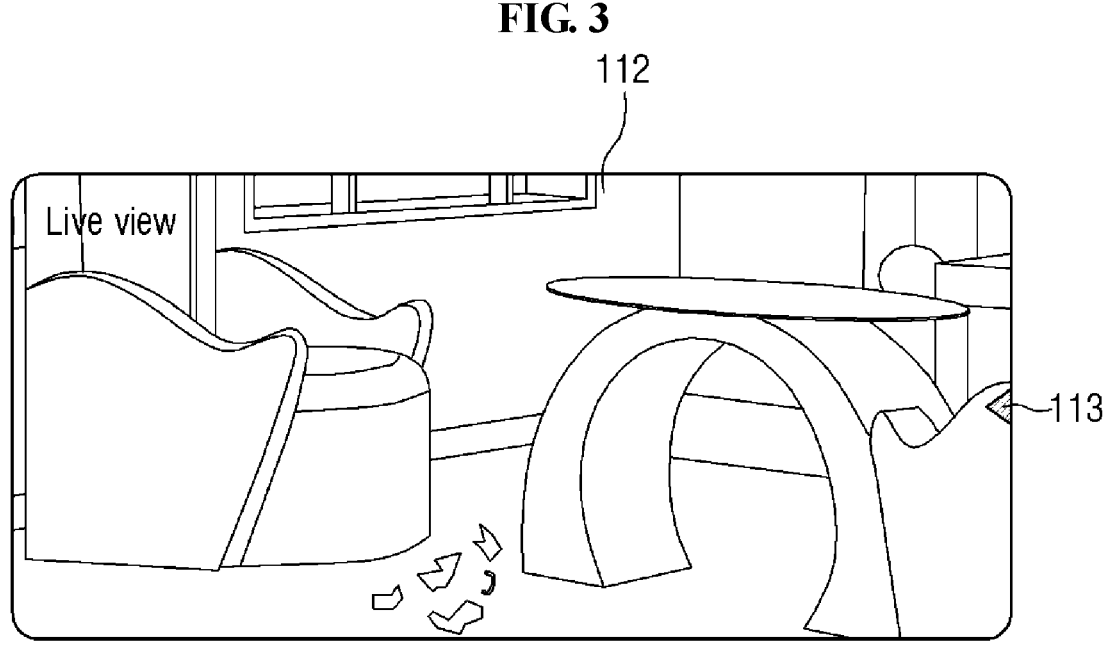
FIG. 3 is a view showing an example in which a start icon 113 is displayed on a screen unit 11 of the event search device 1 according to an embodiment of the present invention.

FIG. 3 is a view showing an example in which a start icon 113 is displayed on the screen unit 11 of the event search device 1 according to an embodiment of the present invention.

When the event search device 1 according to an embodiment of the present invention is executed, a live view is initially displayed through the screen unit 11. At the same time, the start icon 113 is displayed. The start icon 113 is displayed on one side edge of the screen unit 11. The start icon 113 may be very small so as to not obstruct the user's monitoring of the image 112, such as a live view. The start icon 113 may be triangular as shown in FIG. 3, but the present invention is not limited thereto. The start icon 113 may have various shapes such as a semi-circle, a rectangle, and the like.

Figure 4:
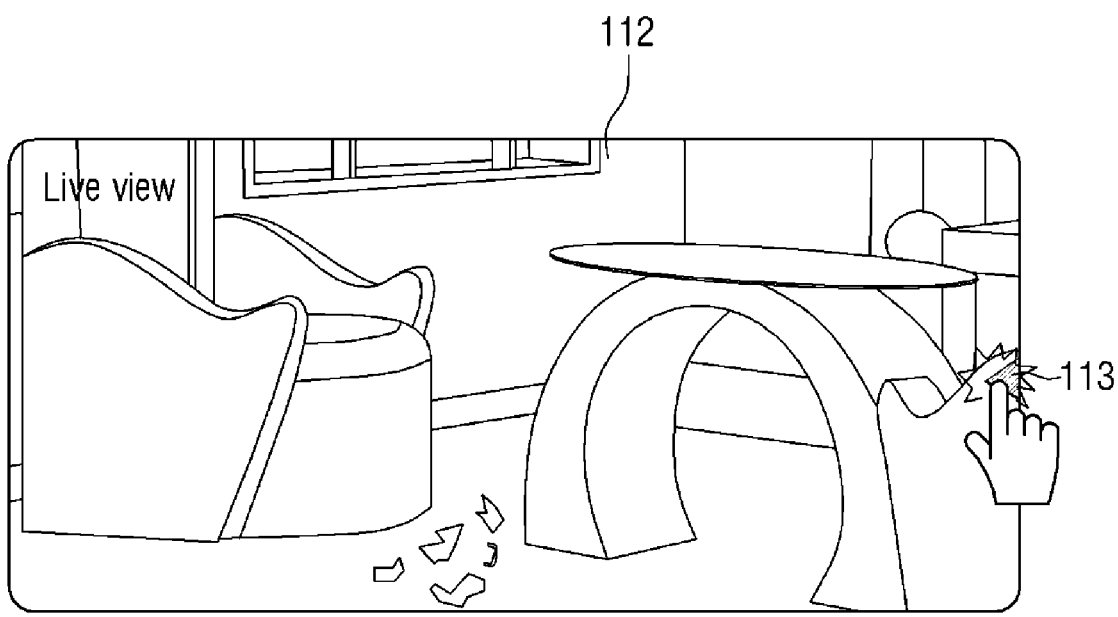
FIG. 4 is a view showing an example of tapping the start icon 113 shown in FIG. 3.
Figure 5:
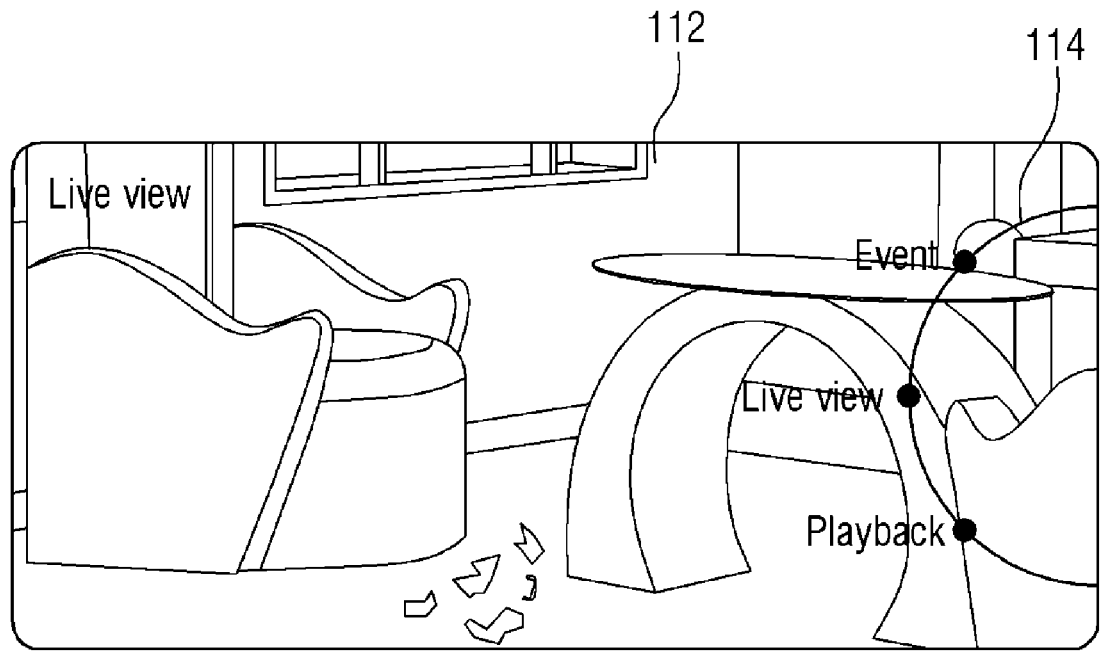
FIG. 5 is a view showing an example in which a menu wheel icon 114 is displayed on the screen unit 11 as a result of the tapping shown in FIG. 4.

FIG. 4 is a view showing an example of tapping the start icon 113 shown in FIG. 3, and FIG. 5 is a view showing an example in which a menu wheel icon 114 is displayed on the screen unit 11 as a result of the tapping shown in FIG. 4.

Tapping, which is one touch gesture, refers to shortly touching the screen unit 11 and removing the touch in a short time. Generally, a touch duration of tapping is less than one second. It is assumed that tapping is consecutively executed several times in a short time period. The tapping is referred to as a double tap when the tapping is made two times and is referred to as a triple tap when the tapping is made three times.

When a user taps the start icon 113, the menu wheel icon 114 is displayed at a location where the start icon was displayed. Accordingly, like the start icon 113, the menu wheel icon 114 may be displayed on one side edge of the screen unit 11 of the event search device 1. Also, since the menu wheel icon 114 is displayed, the start icon 113 may disappear. It is assumed that a user can enter a command to the event search device 1 by means of a mouse. When the user clicks the start icon 113, the menu wheel icon 114 may be displayed.

The menu wheel icon 114 may be formed using dots and lines so as to not obstruct the user's monitoring of the image 112 being displayed. The menu wheel icon 114 may be semi-circular as shown in FIG. 5, but the present invention is not limited thereto. The menu wheel icon 114 may have various shapes such as a triangle, a rectangle, and the like.

Various menus are displayed on the menu wheel icon 114 so that the user may select one of the menus. For example, the menus include Live View, Event, Play Back, Settings, etc. Also, each menu is composed of a point formed as a selection area to be selected by a user and a phrase indicating the name of a corresponding menu. When a user taps or clicks any menu of the menu wheel icon 114, the menu is selected. Also, when a user drags the menu wheel icon 114 upward or downward, the menu wheel icon 114 rotates in a direction in which the dragging is made, and the locations of the menus change.

Live View refers to an image 112 of an area currently captured by the camera 2 being displayed on the event search device 1 in real time. Play Back refers to an image 112 that is previously captured, stored in the storage unit 13, loaded by the event search device 1, and then displayed. Event refers to data that records a specific accident that has occurred. For example, when a specific motion is captured in a house where no one is present, the location and time at which the motion is captured are automatically recorded as data. Setting refers to a menu for a user to change various kinds of options desired by the user. The menus displayed on the menu wheel icon 114 are not limited thereto, and various kinds of menus may be present.

Figure 6:
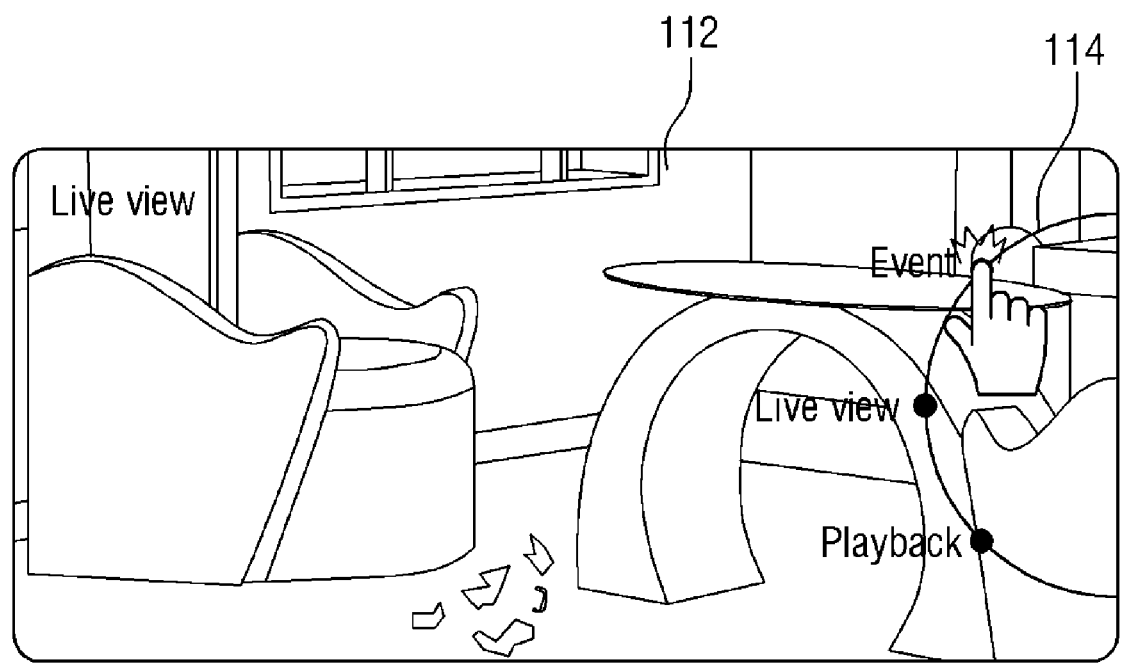
FIG. 6 is a view showing an example of tapping an event menu included in the menu wheel icon 114 shown in FIG. 5.
Figure 7:
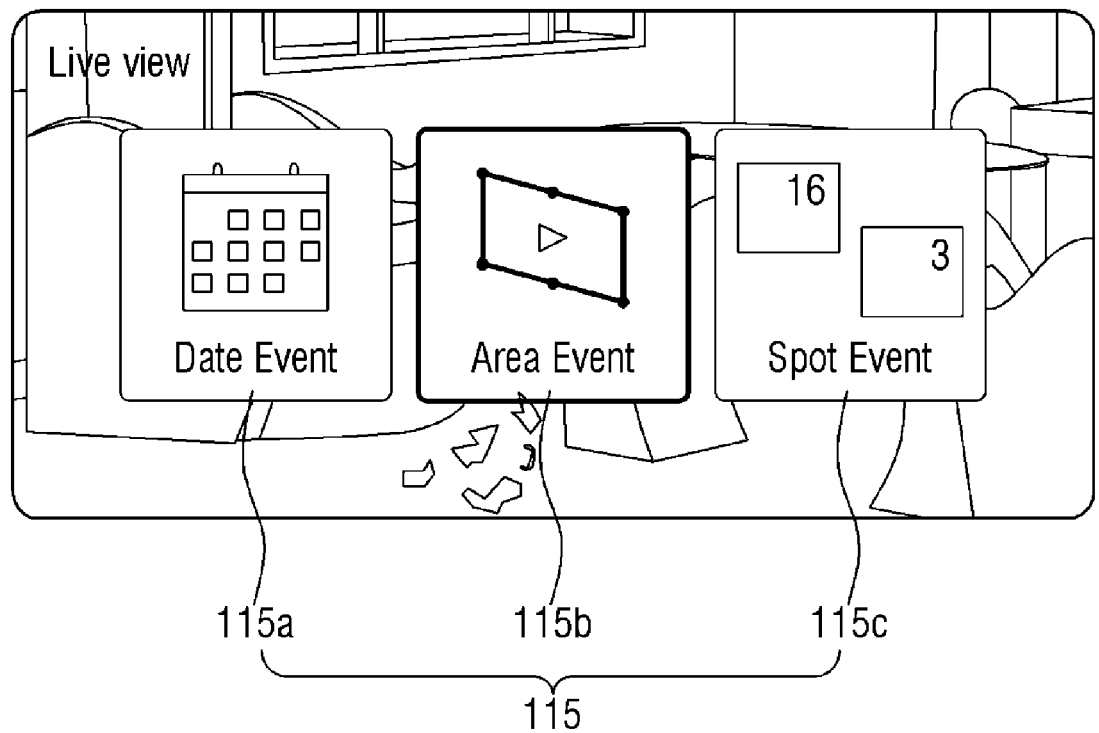
FIG. 7 is a view showing an example in which selection icons 115 are displayed on the screen unit 11 as a result of the tapping shown in FIG. 6.

FIG. 6 is a view showing an example of tapping an event menu included in the menu wheel icon 114 shown in FIG. 5, and FIG. 7 is a view showing an example in which a selection icon 115 is displayed on the screen unit 11 as a result of the tapping shown in FIG. 6.

As shown in FIG. 6, among the various menus displayed on the menu wheel icon 114, a user taps or clicks an event menu. Then, as shown in FIG. 7, selection icons 115 for selecting a method of searching for an event are displayed on the screen unit 11.

As the selection icons 115, one of Date Event in which a time condition is specified to search for an event, Area Event in which a location condition is specified to set a specific location after an event occurs, and Spot Event in which a location condition is specified to preset a specific location before an event occurs may be selected. However, the present invention is not limited thereto. When the event search device 1 according to an embodiment of the present invention provides a function of searching for an event in another method, the selection icon 115 may be additionally displayed on the screen unit 11. In this specification, a user is illustrated as selecting an area event icon 115*b*.

Figure 8:
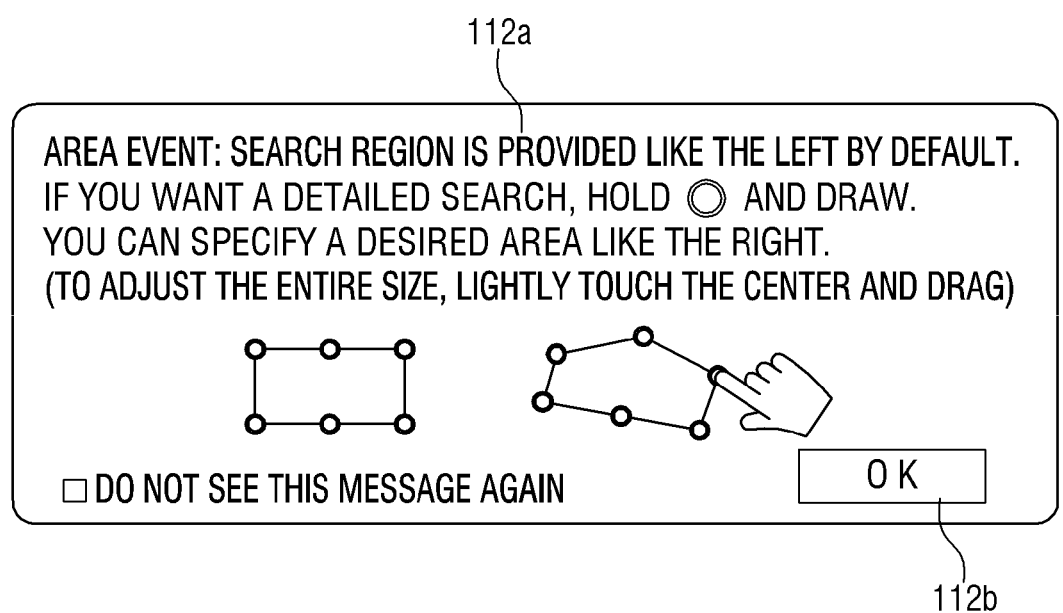
FIG. 8 is a view showing an example in which a notification window 112a is displayed to start setting of an event search area 116 according to an embodiment of the present invention.

FIG. 8 is a view showing an example in which a notification window 112*a* is displayed to start setting of an event search area 116 according to an embodiment of the present invention.

When a user selects an area event icon 115*b* of the selection icon 115 shown in FIG. 7, a notification window 112*a* for starting setting of the event search area 116 is displayed on the screen unit 11 as shown in FIG. 8. The notification window 112*a* simply guides the user to set the event search area 116. A phrase "Don't see this message again" is shown at a left corner of the notification window 112*a* along with a check box. The user may not want to see the notification window 112*a* again. In this case, when the user selects the check box, the notification window 112*a* may not be displayed on the screen unit 11 even when the user selects an area event icon 115*b* again later.

A confirmation button 112*b* is formed at a right corner of the notification window 112*a*. When the user merely taps or clicks the confirmation button 112*b*, the notification window 112*a* disappears, and a main image 112 is displayed on the screen unit 11. The main image 112 may be a live view image, which is captured and acquired by the camera 2 in real time. However, the present invention is not limited thereto, and the main image 112 may be an image 112 that is loaded and displayed after previously being captured.

Figure 9:
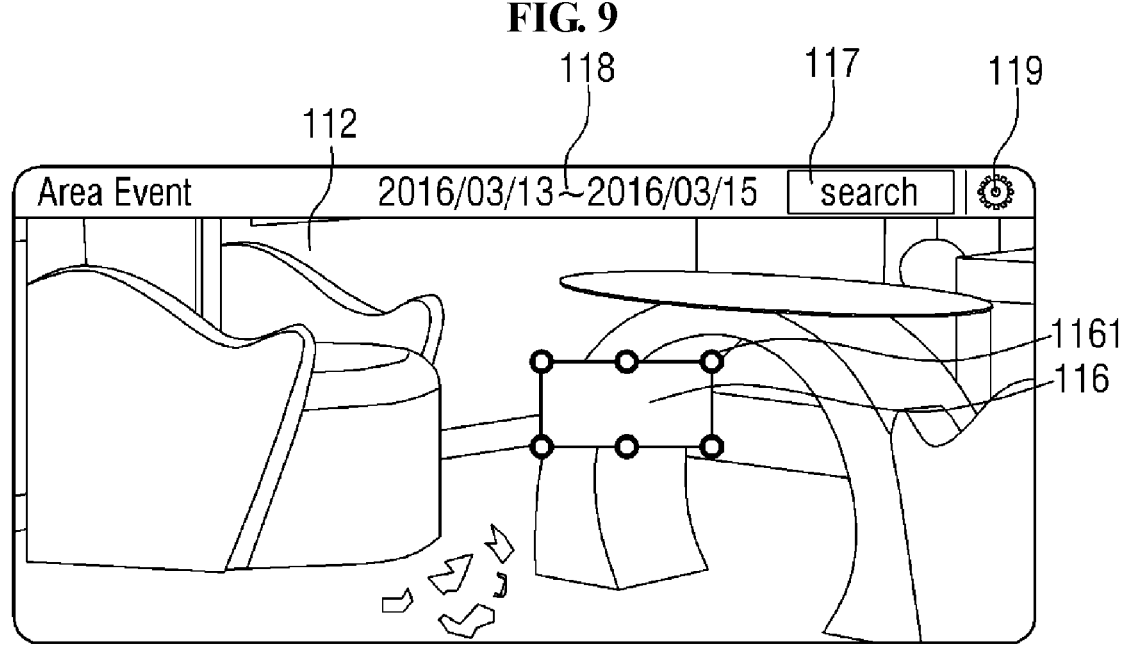
FIG. 9 is a view showing an example in which the event search area 116 is displayed on the screen unit 11 according to an embodiment of the present invention.

FIG. 9 is a view showing an example in which the event search area 116 is displayed on the screen unit 11 according to an embodiment of the present invention.

After the notification window 112*a* disappears, the event search area 116 is also displayed on the screen unit 11 along with the main image 112 as shown in FIG. 9. The event search area 116 is formed by a plurality of joints 1161 being linearly connected to one another to form a single closed line. As a result, the event search area 116 has a polygonal shape, and the plurality of joints 1161 are placed at vertices of the polygonal shape. In particular, the polygon may be a quadrangle, but the present invention is not limited thereto. The polygon may have various shapes. Also, the number of joints 1161 may be six, but the number of joints 1161 may be arbitrarily changed by a user.

When the camera 2 captures a specific area to acquire the image 112, the event occurrence determination unit 22 detects an event occurrence using the acquired image 112. Also, when an event occurs, a metadata generation unit 23 generates metadata 5 including information such as the time and location at which the event occurs. When the user later specifies search conditions for searching for the event, a data search unit 146 derives a search result which satisfies the search conditions using the metadata 5. In this case, the event search area 116 is used by the user to specify a location condition among the search conditions. This will be described in detail below.

The event search area 116 may be placed on the main image 112 and displayed at a point corresponding to a location where the event occurrence determination unit 22 determines an event occurrence. When it is determined that the event has occurred at a plurality of locations, a plurality of event search areas 116 are present, and thus may be displayed at points, which are placed on the main image 112, corresponding to a point where the event has occurred. Alternatively, the plurality of event search areas 116 may be displayed on points that are placed on the main image 112 and that correspond to a point where the events have recently occurred and also may be displayed at arbitrary locations. That is, the event search area 116 according to an embodiment of the present invention is not limited thereto and may be displayed at various points on the main image 112.

Figure 10:
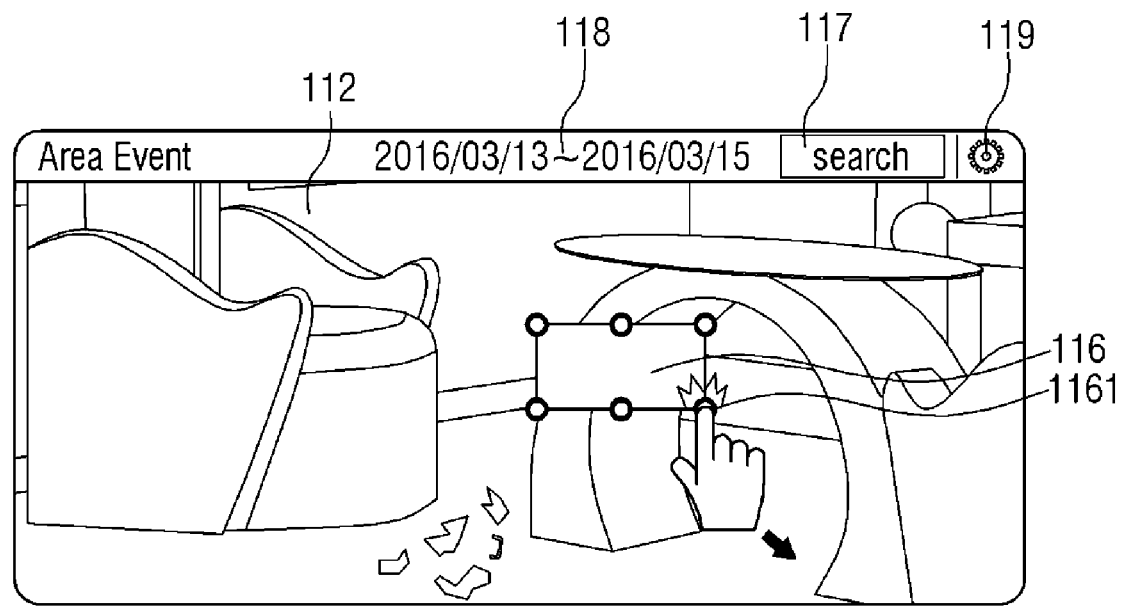
FIG. 10 is a view showing an example of dragging one joint 1161 of the event search area 116 according to an embodiment of the present invention.
Figure 11:
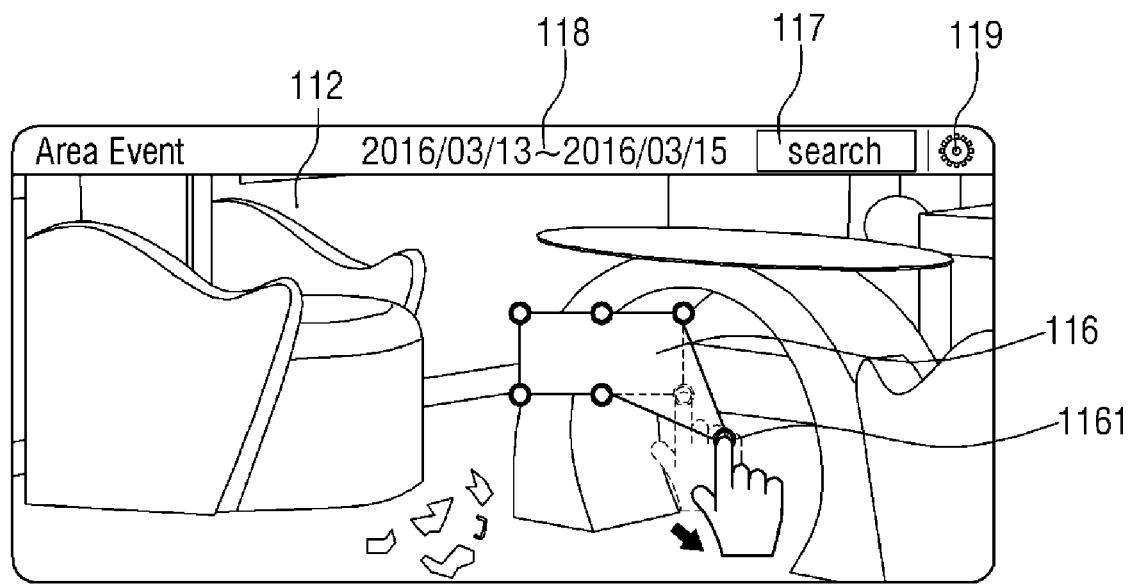
FIG. 11 is a view showing an example in which the event search area 116 is changed in shape as a result of the dragging shown in FIG. 11.

FIG. 10 is a view showing an example of dragging one joint 1161 of the event search area 116 according to an embodiment of the present invention, and FIG. 11 is a view showing an example in which the event search area 116 is changed in shape as a result of the dragging shown in FIG. 11.

Dragging, which is one touch gesture, refers to drawing a specific outline on a screen from one point to another point in order to move the specific object.

In order to perform dragging, a user touches and holds one joint 1161 of the event search area 116. Here, holding refers to maintaining a touch for a predetermined time or more before dragging. The predetermined time may be about 0.5 seconds to 1 second, but the present invention is not limited thereto. Also, as shown in FIG. 10, a single joint 1161 is drawn from one point to another point. Then, as shown in FIG. 11, the single joint 1161 moves from one point to another point by dragging with a finger or the like. Also, a straight line for connecting the single joint 1161 and its other adjacent joints 1161 have a length and a formation direction thereof changed such that the connection between the joints 1161 is maintained. As a result, the event search area 116 changes in shape, as shown in FIG. 11. In this case, in order to drag the single joint 1161, the user should keep the touch. After arriving at a desired point, the user releases the touch. When the touch is released, the dragged joint 1161 is fixed at a point where the touch is released.

When the user enters a command to the event search device 1 by means of a mouse, the joint 1161 may move from one point to another point by dragging the single joint 1161 with the mouse.

Figure 12:
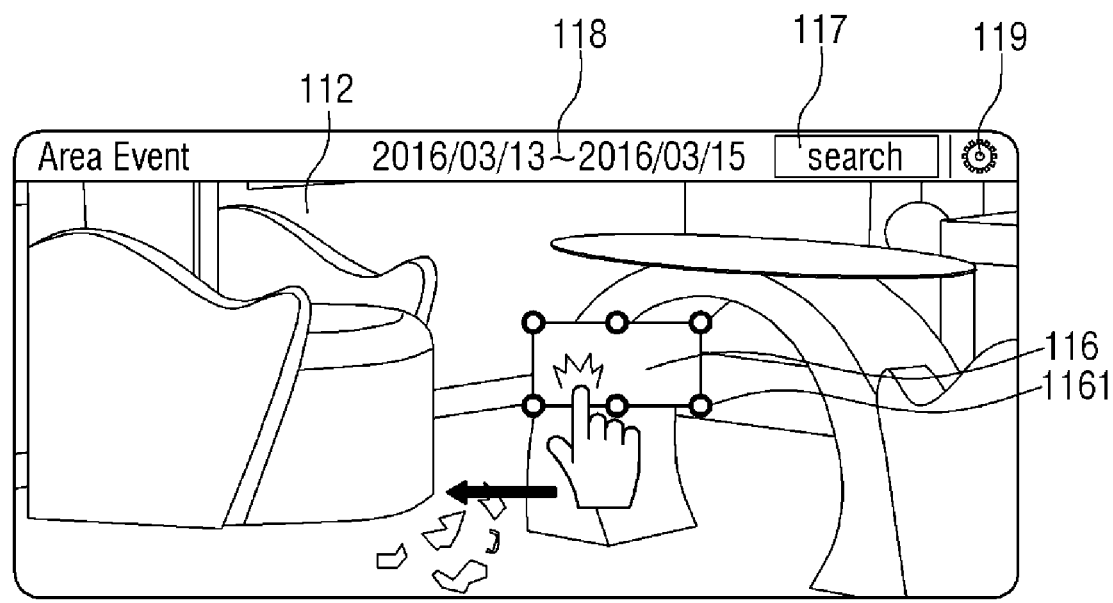
FIG. 12 is a view showing an example of dragging the event search area 116 according to an embodiment of the present invention.
Figure 13:
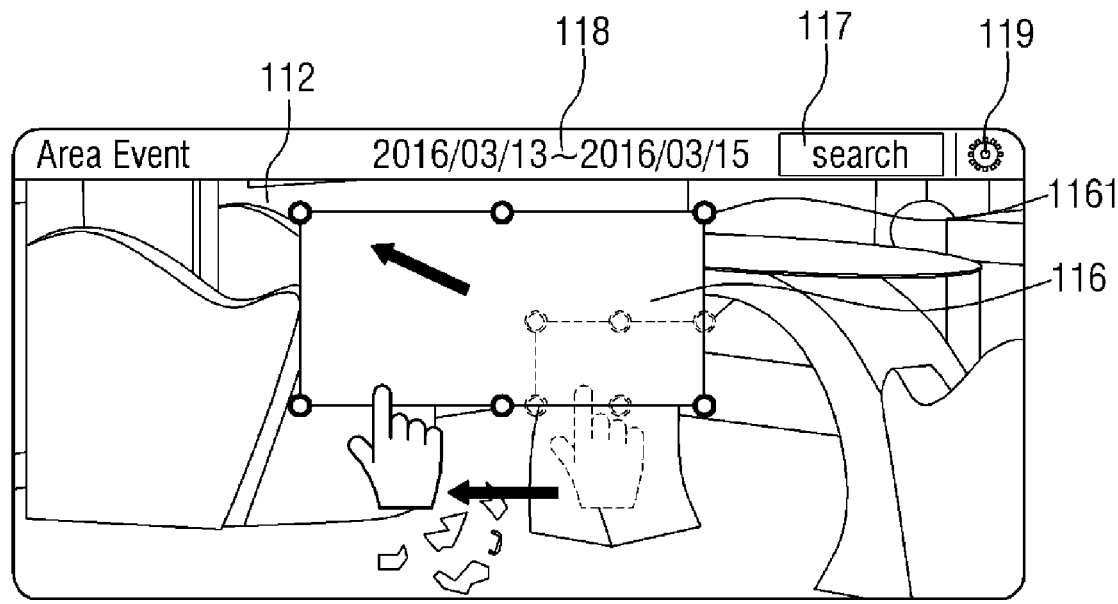
FIG. 13 is a view showing an example in which the event search area 116 is enlarged in size as a result of the dragging in FIG. 12.

FIG. 12 is a view showing an example of dragging the event search area 116 according to an embodiment of the present invention, and FIG. 13 is a view showing an example in which the event search area 116 is enlarged in size as a result of the dragging in FIG. 13.

In order to perform dragging, a user touches and holds an approximate center of the event search area 116. Also, as shown in FIG. 12, the approximate center of the event search area 116 is dragged from one point to another point. Then, as shown in FIG. 13, the event search area 116 changes in size. When the dragging is toward the outside of the event search area 116, the event search area 116 is enlarged in size. On the other hand, when the dragging is toward the inside of the event search area 116, the event search area 116 is reduced in size. In this case, in order to change the size of the event search area 116, the user should keep the touch. After the event search area 116 is changed to a desired size, the touch is released. When the touch is released, the event search area 116, which has changed in size, is fixed to a specific size.

It is assumed that a user can enter a command to the event search device 1 by means of a mouse. When an approximate center of the event search area 116 is dragged by means of the mouse, the event search area 116 may be changed in size.

Also, although not shown, a user may enlarge the event search area 116 through pinching in. Here, the pinching, which is one touch gesture, refers to sliding in opposite directions while keeping a touch with two fingers. Generally, pinching is used to adjust the magnification of a screen displayed on the screen unit 11. When the sliding is in a direction in which two fingers approaches each other, the pinching is called Pinch In or Pinch Close. At this time, the image 112 may be reduced. On the other hand, when the sliding is in a direction in which two fingers move away from each other, the pinching is called Pinch Out or Pinch Open. At this time, the image 112 may be enlarged.

When a user touches the event search area 116 with two fingers and then performs Pinch In, the event search area 116 is reduced in size. On the other hand, when a user touches the event search area 116 with two fingers and then performs Pinch Out, the event search area 116 is enlarged in size.

Figure 14:
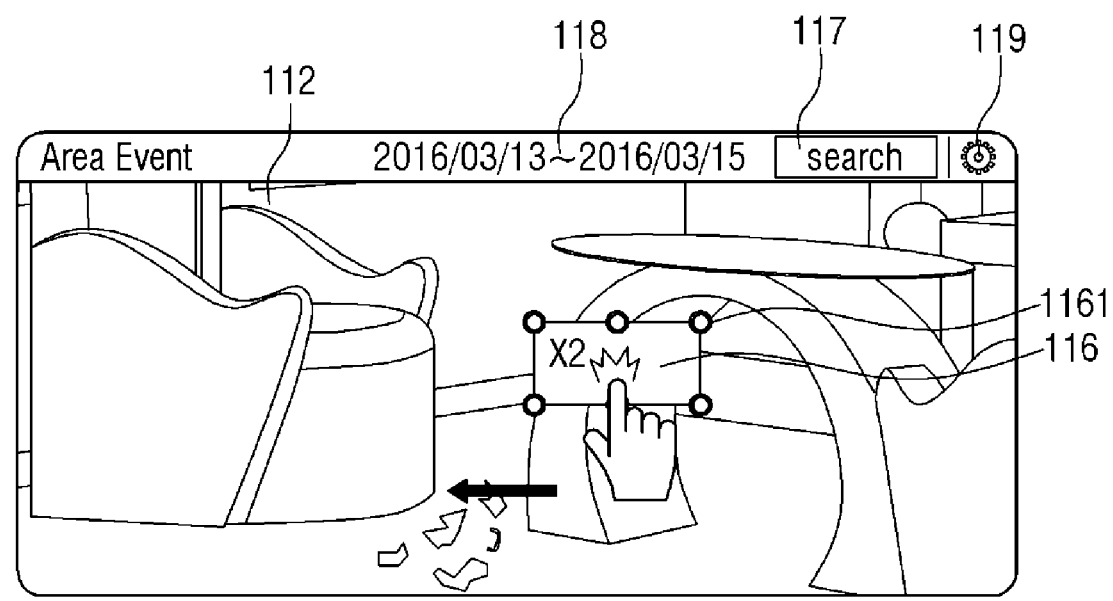
FIG. 14 is a view showing an example of double-tapping and dragging the event search area 116 according to an embodiment of the present invention.
Figure 15:
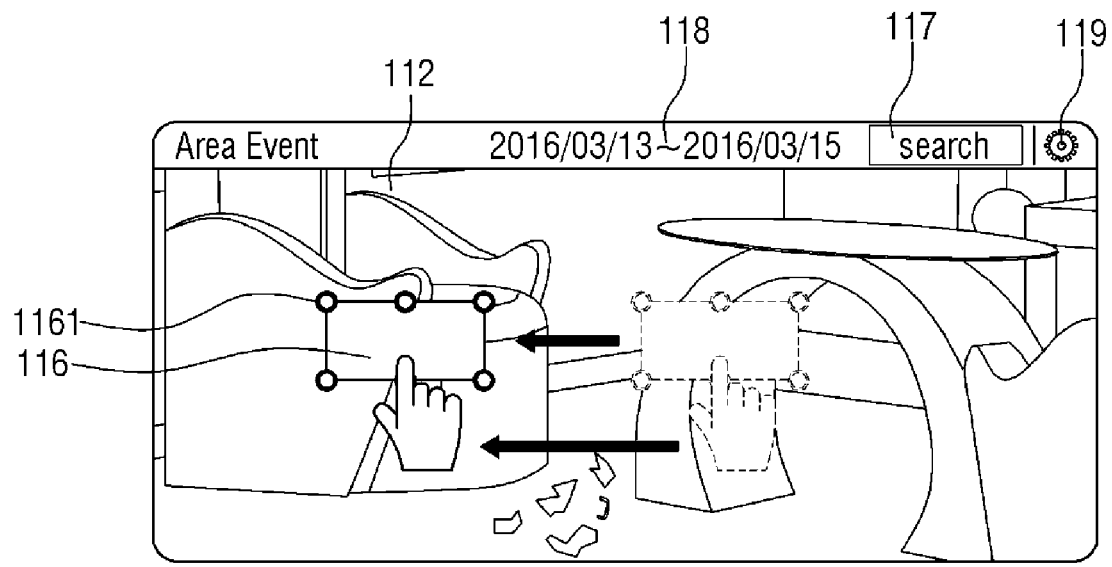
FIG. 15 is a view showing an example in which the event search area 116 is moved as a result of the double-tapping and dragging shown in FIG. 14.

FIG. 14 is a view showing an example of double-tapping and dragging the event search area 116 according to an embodiment of the present invention, and FIG. 15 is a view showing an example in which the event search area 116 is moved as a result of the double-tapping and dragging shown in FIG. 14.

In order to perform dragging, a user double-touches and holds an approximate center of the event search area 116. Here, double-touching and holding refers to consecutively touching the screen unit 11 two times in a short time, but the first touch is shortly made on the screen unit 11 and then instantly released, and the second touch is held for a predetermined time. Also, as shown in FIG. 14, the event search area 116 is dragged from one point to another point. Then, as shown in FIG. 15, the event search area 116 moves from one point to another point by dragging with a finger or the like. In this case, in order to draw the event search area 116, the user should keep the touch. After arriving at a desired point, the user releases the touch. When the touch is released, the event search area 116, which has been dragged, is fixed at a point where the touch is released.

It is assumed that a user can enter a command to the event search device 1 by means of a mouse. When an approximate center of the event search area 116 is double-clicked and dragged by means of the mouse, the event search area 116 may move from one point to another point.

Figure 16:
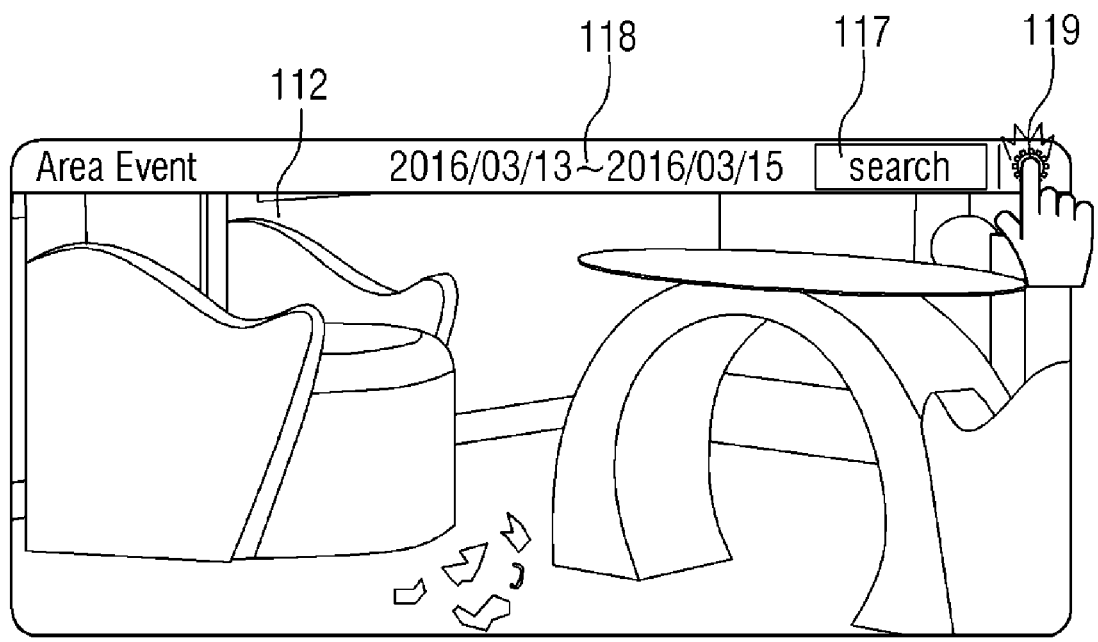
FIG. 16 is a view showing an example of selecting a settings icon 119 according to an embodiment of the present invention.
Figure 17:
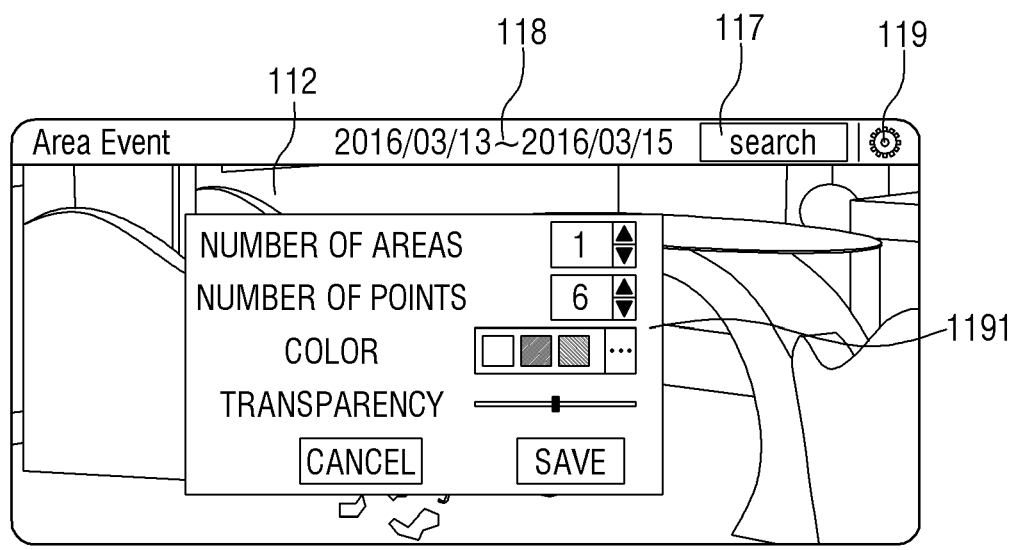
FIG. 17 is a view showing an example in which a settings window 1191 is displayed on the screen unit 11 as a result of the selection shown in FIG. 16.

FIG. 16 is a view showing an example of selecting a settings icon 119 according to an embodiment of the present invention, and FIG. 17 is a view showing an example in which a settings window 1191 is displayed on the screen unit 11 as a result of the selection shown in FIG. 16.

When a user taps the settings icon 119 as shown in FIG. 16, the settings window 1191 is displayed on the screen unit 11 as shown in FIG. 17. The settings window 1191 may be used for changing various kinds of settings of the event search area 116.

The number of event search areas 116 initially displayed, the number of joints 1161 of an event search area 116, the color and transparency of an event search area 116, and the like may be set through the settings window 1191. As described above, the event search area 116 may be displayed at a point, which is placed on the main image 112, corresponding to a location where the event occurrence determination unit 22 determines an event occurrence. When it is determined that the event has occurred at a plurality of locations, a plurality of event search areas 116 are present, and thus the plurality of event search areas 116 may be placed on the main image 112 and displayed at points corresponding to a point where the event has occurred. However, although it is determined that the event has occurred at a plurality of locations, a user may want to search for the occurrence of the event at only one location. In this case, through the settings window 1191, the user may restrict the number of event search areas 116 to one. Alternatively, although it is determined that the event has occurred at a single location, a user may want to search for the occurrence of the event at a plurality of locations. In this case, through the settings window 1191, the user may change the number of event search areas 116 to a plural number.

There is a case in which a location to be searched should be a more detailed shape. In this case, as the vertices of the event search area 116 increase, the event search area 116 may have more various and detailed shapes. The event search area 116 is formed by connecting a plurality of joints 1161 to one another by using straight lines. Accordingly, the joints 1161 correspond to the vertices of the event search area 116, and the straight lines correspond to the edges of the event search area 116. Accordingly, a user may change the number of joints 1161 of the event search area 116 to variously change the shape of the event search area 116. In this case, at least three joints 1161 should be present so that the event search area 116 has a width. Therefore, the minimum number of joints 1161 that can be changed in the settings window 1191 may be limited to three. However, the present invention is not limited thereto. The number of joints 1161 may be set to one or two. The event search area 116 is formed as a point when the number of joints 1161 is one and as a line when the number of joints 1161 is two. That is, the event search area 116 no longer have a width, and a user specifies a location condition for event search as a point or line.

A color may be changed to the user's taste simply in order to provide a visual aesthetic impression to the user. However, the event search area 116 may be changed in color in order to distinguish from the background of the displayed image 112. For example, it is assumed that the background of the image 112 is wholly dark. In this case, when the event search area 116 is represented in a dark color, it is difficult for a user to distinguish the event search area 116. However, when the event search area 116 is changed to a bright color, the user may easily distinguish the event search area 116. That is, the color has a function of identifying the event search area 116 as well as an aesthetic function.

Also, the event search area 116 may be displayed over the main image 112, which obstructs the user from monitoring the image 112. Accordingly, the user may adjust the transparency of the event search area 116 to easily monitor the main image 112.

When the user taps a save button after changing the various kinds of settings of the event search area 116, the changed settings are saved, and the settings window 1191 disappears.

Figure 18:
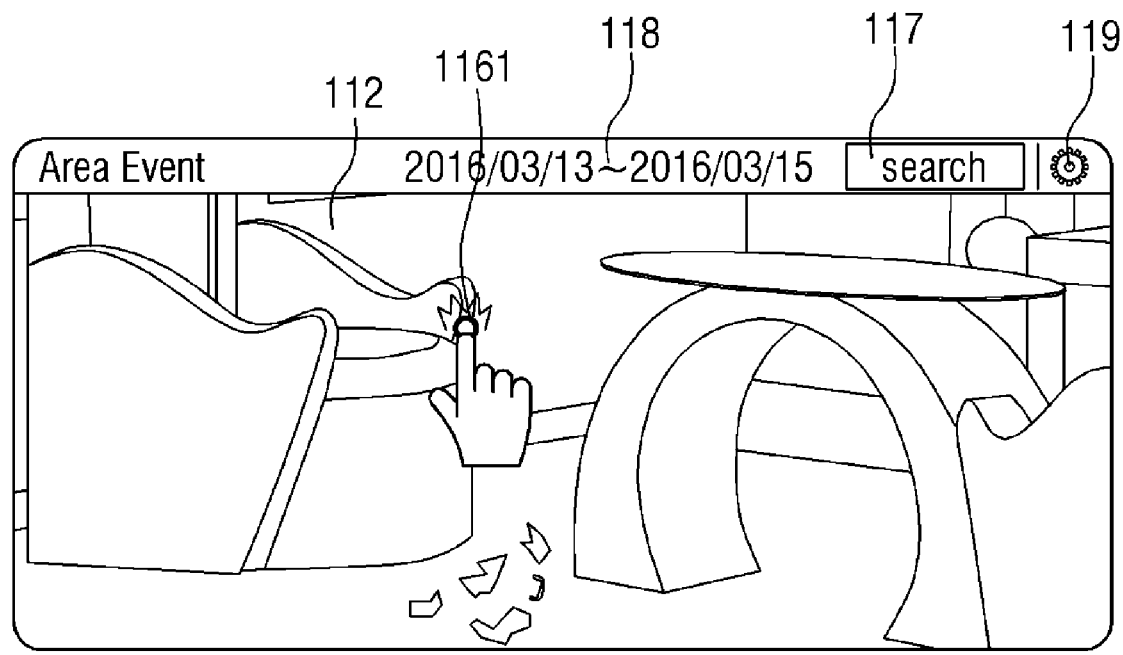
FIG. 18 is a view showing an example of tapping the screen unit 11 one time according to another embodiment of the present invention.
Figure 19:
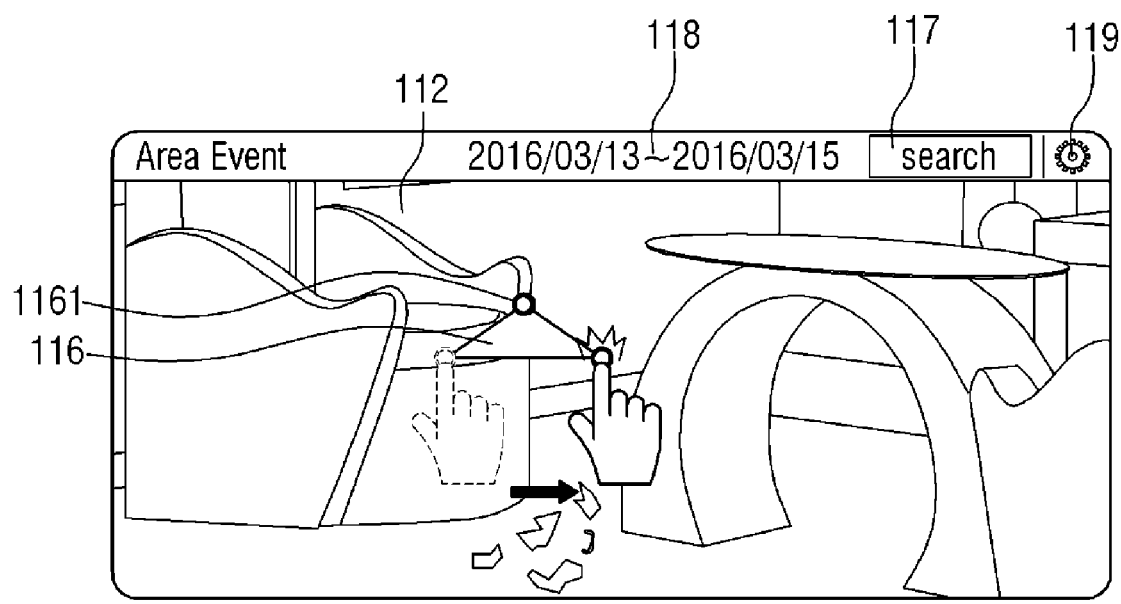
FIG. 19 is a view showing an example of tapping the screen unit 11 two more times according to another embodiment of the present invention.

FIG. 18 is a view showing an example of tapping the screen unit 11 one time according to another embodiment of the present invention, and FIG. 19 is a view showing an example of tapping the screen unit 11 two more times according to another embodiment of the present invention.

In an embodiment of the present invention, as shown in FIG. 9, the event search area 116 is displayed on the screen unit 11 immediately after the notification window 112*a* shown in FIG. 8 disappears. However, in another embodiment of the present invention, even when the notification window 112*a* shown in FIG. 8 disappears, the event search area 116 is not immediately displayed on the screen unit 11. Also, the user may set the event search area 116 by directly specifying a location to be searched on the main image 112. As shown in FIG. 18, when a user taps the screen unit 11 one time, a first joint 1161*a* is displayed at a point tapped by the user on the main image 112 which is displayed on the screen unit 11. Subsequently, as shown in FIG. 19, when the user taps the screen unit 11 two more times, second and third joints 1161*b* and 1161*c* are displayed at points tapped by the user on the main image 112 displayed on the screen unit 11.

As described above, at least three joints 1161 should be present so that the event search area has a polygonal shape. Accordingly, as shown in FIG. 19, when the first, second, and third joints 1161*a*, 1161*b*, and 1161*c* are displayed on the screen unit 11, the first, second, and third joints 1161*a*, 1161*b*, and 1161*c* are connected to one another by using straight lines, and thus the event search area 116 is displayed as a triangle.

Figure 20:
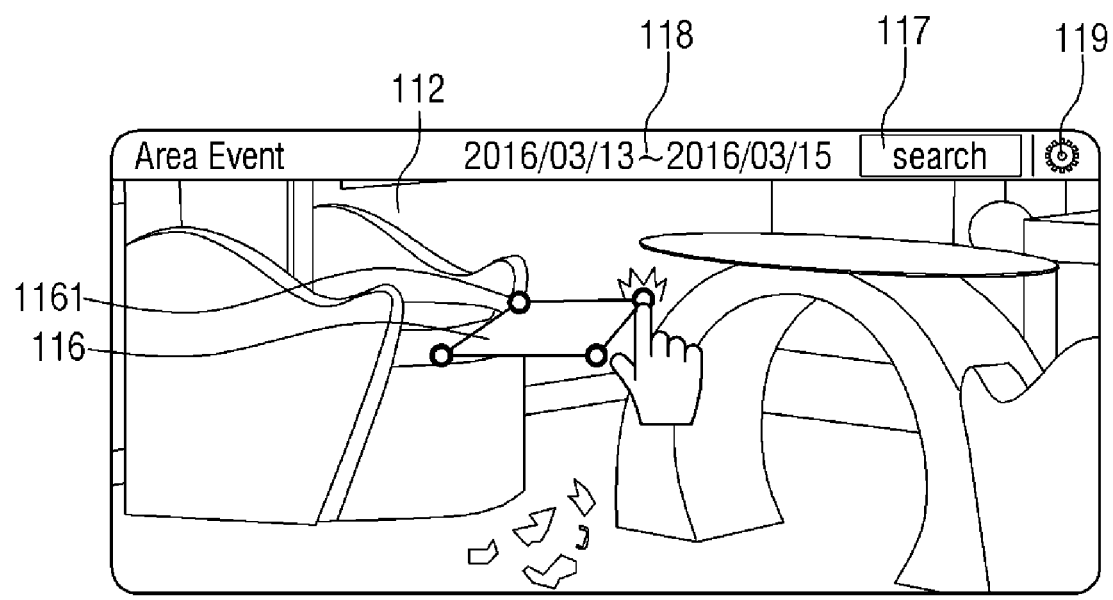
FIG. 20 is a view showing an example of tapping the screen unit 11 one more time according to another embodiment of the present invention.

FIG. 20 is a view showing an example of tapping the screen unit 11 one more time according to another embodiment of the present invention.

Subsequently, when the user taps the screen unit 11 one more time, a fourth joint 1161*d* is displayed at a point tapped by the user on the main image 112 displayed on the screen unit 11, as shown in FIG. 20. At this point, one of the straight lines connecting the first, second, and third joints 1161*a*, 1161*b*, and 1161*c* to one another disappears. Here, a straight line closest to the fourth joint 1161*d* may disappear. Thus, two joints 1161, which were connected to each other by the disappearing straight line, are adjacent to the fourth joint 1161*d*, and straight lines are formed to connect the fourth joint 1161*d* to the two joints 1161. Accordingly, the event search area 116 has a quadrangular shape. That is, whenever the user additionally taps the screen unit 11, the number of vertices of the event search area 116 increases, and the event search area 116 changes in shape.

Figure 21:
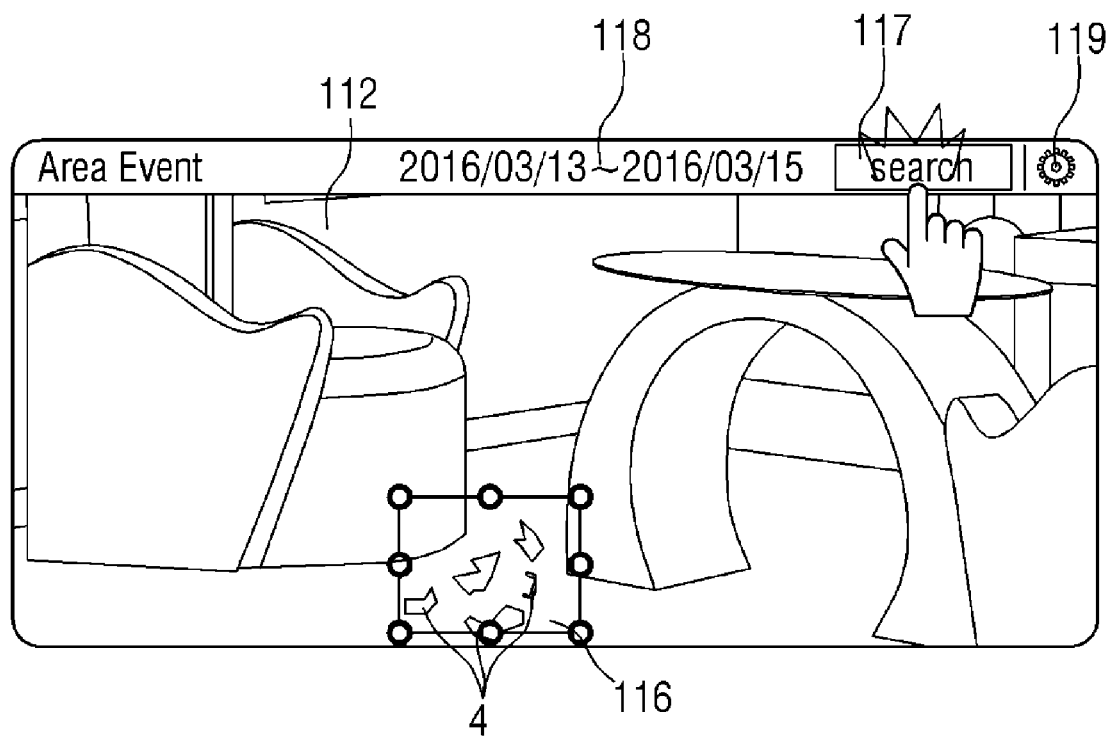
FIG. 21 is a view showing an example of tapping a search button 117 according to an embodiment of the present invention.
Figure 22:
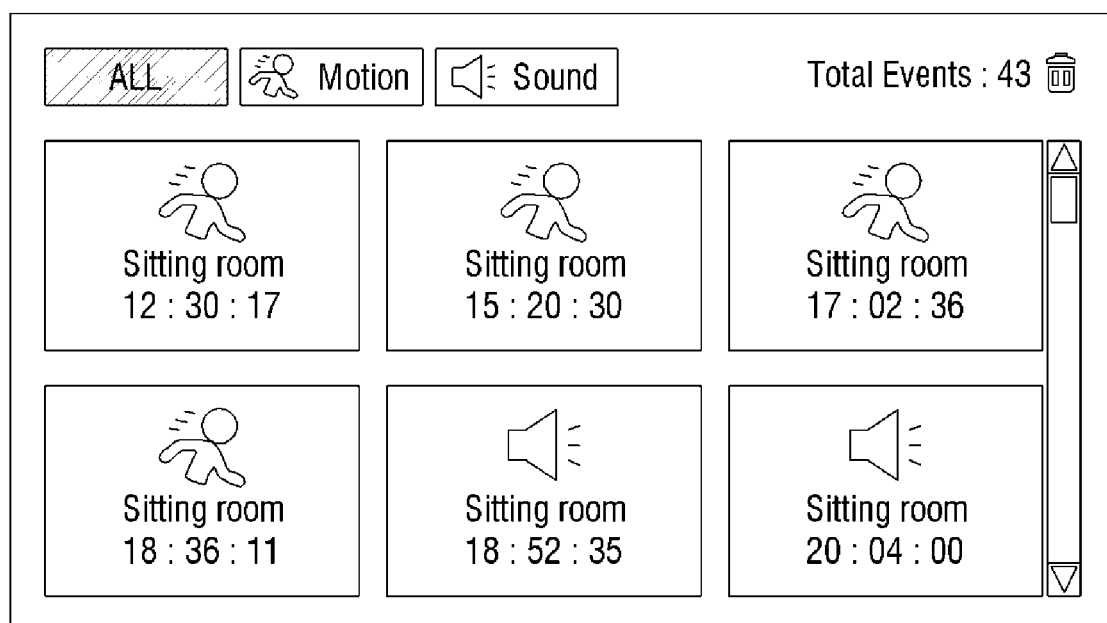
FIG. 22 is a view showing an example in which a search result is output as a result of the tapping shown in FIG. 21.

FIG. 21 is a view showing an example of tapping a search button 117 according to an embodiment of the present invention, and FIG. 22 is a view showing an example in which a search result is output as a result of the tapping shown in FIG. 21.

After the setting of the event search area 116 with respect to a location to be searched is completed, the user taps the search button 117 as shown in FIG. 21. Then, as shown in FIG. 22, events that occurred in the event search area 116 are found and output. The user may check the events by playing back images 112 found.

The number of events that occurred, the type of events that occurred, and the like appear as a search result. For example, the total number of events which satisfy a specified search condition is 43. Also, when the user taps the search button 117, events satisfying the specified search condition are found and output as shown in FIG. 22. It is assumed that the camera 2 captures a corresponding area only when an event occurs and ends the capturing immediately after the event ends. In this case, only one event will be recorded in one image 112. In this case, the number of images 112 found is 43. Also, when the images 112 are played back, the user may check the events.

A method in which a user specifies the location condition for the purpose of the event search has been described above. The method may be carried out through a user interface (UI) of the event search device 1. An operation in which the event search device 1 according to an embodiment of the present invention searches for an event when the user specifies the location condition through the above method will be described below.

Figure 23:
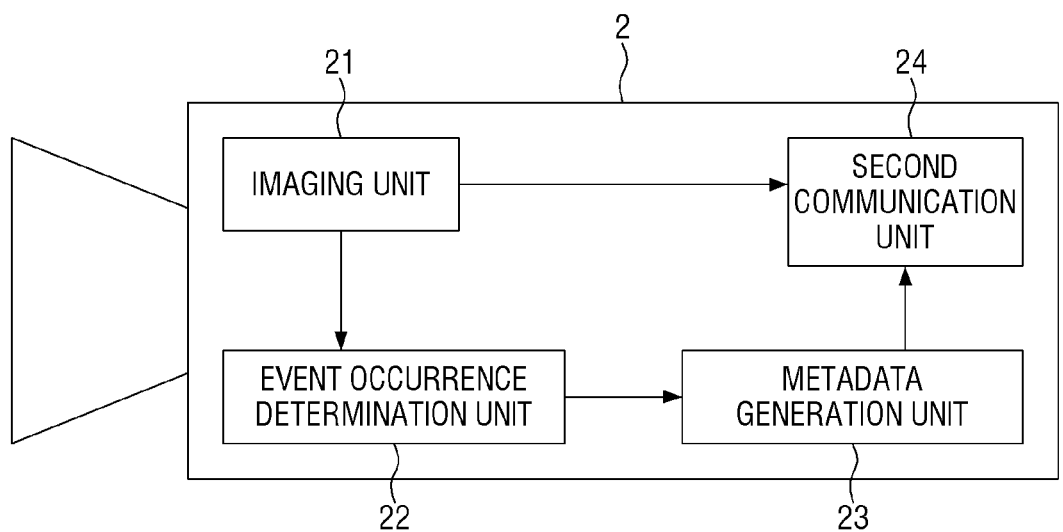
FIG. 23 is a block diagram showing a detailed configuration of a camera 2 according to an embodiment of the present invention.

FIG. 23 is a block diagram showing a detailed configuration of the camera 2 according to an embodiment of the present invention.

The camera 2 includes an imaging unit 21 configured to receive an image signal, a second communication unit 24 configured to transmit an image 112 and data to the event search device 1, an event occurrence determination unit 22 configured to determine whether an event occurs, and a metadata generation unit 23 configured to generate metadata 5 using information regarding an event if the event occurs.

The imaging unit 21 receives an image signal for a specific area. The imaging unit 21 generally includes an image device such as a charge coupled device (CCD) or a complementary metal oxide semiconductor (CMOS) image sensor. A CCD is configured to accumulate and then transmit electrons generated by the photoelectric effect when light is emitted to a plurality of photodiodes. In this case, information regarding images constituting a screen is generated by analyzing a change in the number of electrons generated depending on the number of photons and reconfiguring the information. A CCD has an advantage of having sharp image quality and low noise, but has disadvantages of having high power consumption and slow processing speed.

A CMOS image sensor is an image sensor using a CMOS and is configured to amplify electrons generated by light into an electric signal by means of an amplifier installed in each cell and transmit the electric signal. A CMOS image sensor has advantages of being low cost and having low power consumption and fast processing speed, but has disadvantages of having high noise.

The event occurrence determination unit 22 determines whether an event occurs. When an event occurs, the event occurrence determination unit 22 may determine whether the event occurs by internally analyzing an image 112 of the camera 2 or by receiving a signal generated by the sensor 3, which is separately provided. When the occurrence of the event is determined through the sensor 3, the sensor may include a motion detection sensor for detecting a movement of a person or an animal, a sound detection sensor for detecting a sound of a surrounding area, a temperature detection sensor for detecting a surrounding temperature, and a gas detection sensor for detecting a gas generation. However, the sensor 3 is not limited thereto, and various kinds of sensors 3 may be used as long as the sensors 3 detect any kind of events.

When the event occurrence determination unit 22 internally analyzes an image 112 of the camera 2 to determine whether the event has occurred, the event occurrence determination unit 22 obtains a normal image 112 in advance and then determines the occurrence of the event through a change in a pixel value within a frame of the image 112. In this case, the event occurrence determination unit 22 may accurately and easily determine whether an event, such as an earthquake, a fire, and a movement of the object 4, has occurred through the image 112. A process in which the event occurrence determination unit 22 determines whether an event has occurred will be described below in detail.

When an event occurs, the metadata generation unit 23 generates the metadata 5 by using information regarding the event. The metadata 5 indicates data regarding description of specific data and summarization of types. The metadata 5 according to an embodiment of the present invention will be described below in detail.

The second communication unit 24 may transmit and receive signals and data to and from the event search device 1 in a wired or wireless manner. For example, the second communication unit 24 modulates signals and data, performs frequency up-conversion on the signals and data, and then transmits the signals and data to the event search device 1, or performs down-conversion on signals and data received from the event search device 1 and demodulates the signals and data. During such a process, the second communication unit 24 may receive data or signals from the event search device 1 and may transmit image data, metadata 5, or signals to the event search device 1.

Figure 24:
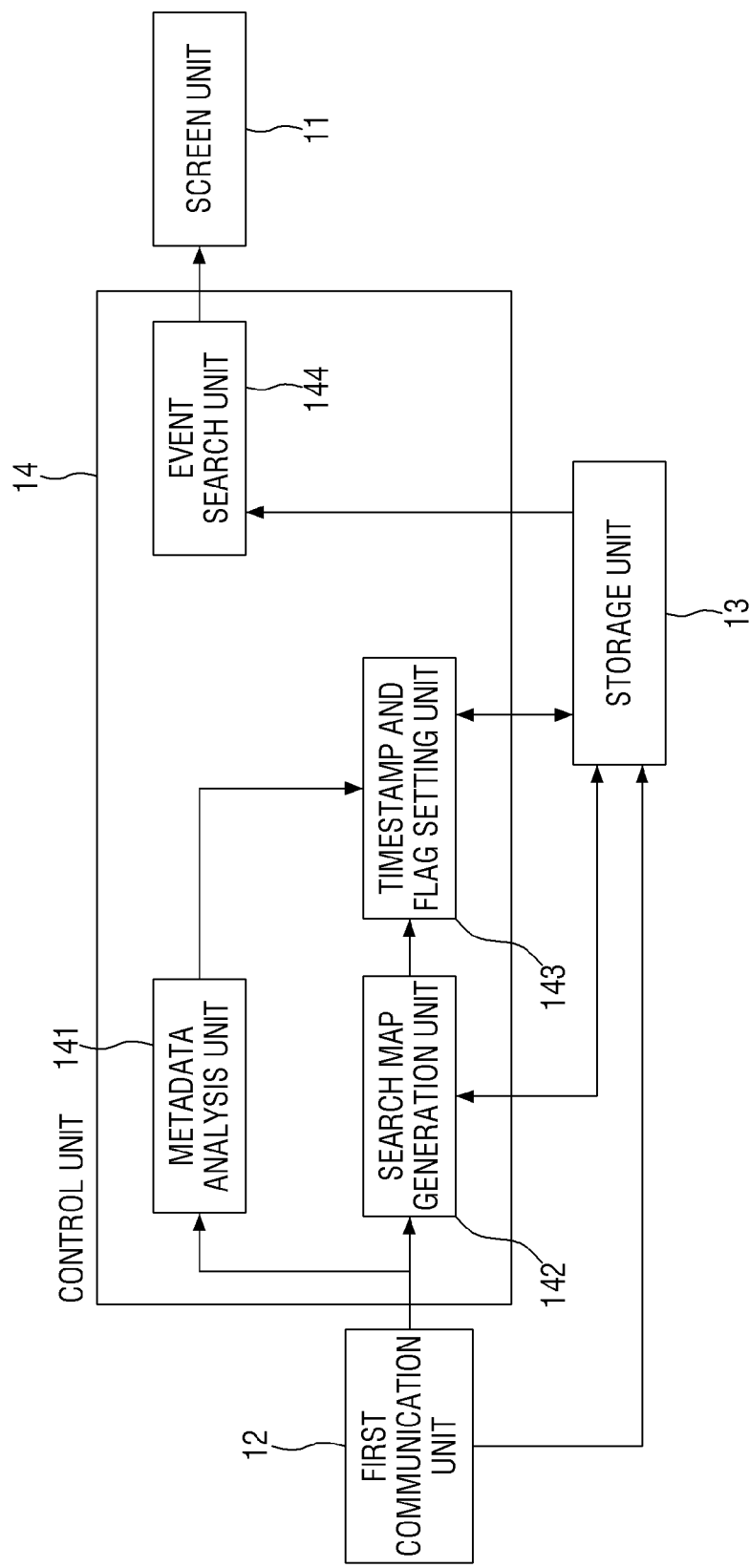
FIG. 24 is a block diagram showing a detailed configuration of a control unit 14 according to an embodiment of the present invention.

FIG. 24 is a block diagram showing a detailed configuration of a control unit 14 according to an embodiment of the present invention.

The control unit 14 includes a metadata analysis unit 143 configured to analyze metadata 5, a search map generation unit 144 configured to generate a search map 6 such that the search map 6 is correspondingly mapped to an image 112 when the event occurs, a timestamp and flag setting unit 145 configured to set a timestamp 61 and a flag 62 on the generated search map 6, and a data search unit 146 configured to search for data according to a user's command.

The metadata analysis unit 143 analyzes the generated metadata 5. According to an embodiment of the present invention, the metadata 5 includes information regarding an identified object 4, a location where an event has occurred, a time when an event has occurred, and the like. The metadata analysis unit 143 analyzes the metadata 5, extracts such information, and then transmits the information to the timestamp and flag setting unit 145.

When an event occurs, the search map generation unit 144 generates a search map 6 such that the search map 6 is correspondingly mapped to an image 112. When the metadata 5 is transmitted from the camera 2, the search map generation unit 144 recognizes the fact that the metadata 5 is transmitted and checks whether a search map 6 is already generated and stored in the storage unit 13. When the search map 6 is already generated and stored, there is no need to generate the search map 6. On the other hand, when no search map 6 is stored, the search map generation unit 144 generates a new search map 6.

A search map 6 refers to a space capable of setting the timestamp 61 and the flag 62 for a point where the event has occurred by being correspondingly mapped to the image 112. When a user enters a search condition to search for an event, the data search unit 146 may output a desired search result by searching for a timestamp 61 and a flag 62 set in the search map 6. Accordingly, the search map 6 is conceptually equal to a search tool capable of collecting bibliographic data entered all at once and later searching only the search map 6 to search for all events.

The search map 6 is a space that is generated inside the event search device 1 to facilitate event search. Accordingly, the search map 6 is not physically present or cannot be displayed through the screen unit 11 and visually checked. However, the present invention is not limited thereto, and the search map 6 may be displayed through the screen unit 11 according to a user's command.

Since the search map 6 corresponds to the image 112, the search map 6 is also quadrangular when the image 112 displayed through the screen unit 11 is quadrangular. Also, the image 112 may have the same aspect ratio as the search map 6. However, since the search map 6 is satisfied by corresponding to the image 112 in terms of only time and coordinates, the resolution, fps, bit rate, etc. of the image 112 do not affect the search map 6. Accordingly, even when the resolution, fps, bit rate, etc. of the image 112 change, the search using the search map 6 is not obstructed. Also, the search map 6 may be divided into a plurality of blocks of a predetermined size. The plurality of blocks are each a criterion for a search condition for an area when the data search unit 146 searches for data later.

The timestamp and flag setting unit 145 sets a timestamp 61 and a flag 62 on the search map 6. When the metadata analysis unit 143 transmits information included in the metadata 5 to the timestamp and flag setting unit 145, the timestamp and flag setting unit 145 sets the timestamp 61 and the flag 62 on the search map 6 on the basis of the information. A process of setting the timestamp 61 and the flag 62 on the search map 6 will be described below in detail.

The data search unit 146 searches for event data according to a user's command. In order to search for the event data, the user specifies search conditions such as a time condition, a location condition, or the like. The data search unit 146 may quickly output a search result corresponding to the specified search conditions by searching for the timestamp 61 and the flag 62 set on the search map 6 as described above. When the timestamp 61 and the flag 62 corresponding to the specified search conditions are found, the data search unit 146 may derive metadata 5 corresponding to the timestamp 61 and the flag 62, load image data corresponding to the derived metadata 5 from the storage unit, and output the image data to the screen unit 11.

Figure 25:
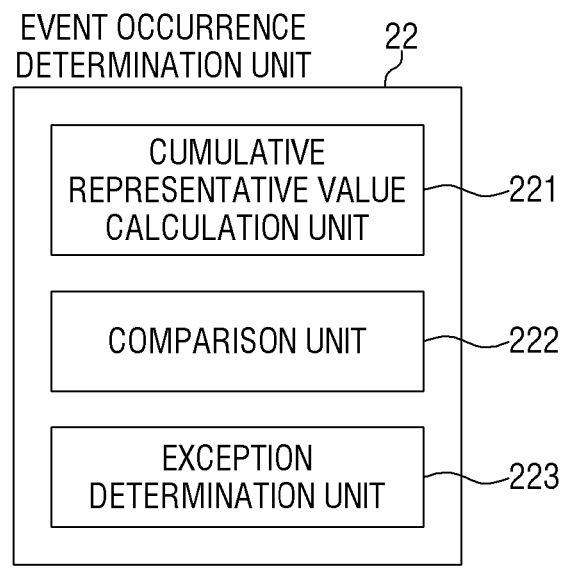
FIG. 25 is a block diagram showing a detailed configuration of an event occurrence determination unit 22 according to an embodiment of the present invention.

FIG. 25 is a block diagram showing a detailed configuration of the event occurrence determination unit 22 according to an embodiment of the present invention.

The event occurrence determination unit 22 determines whether an event occurs by internally analyzing an image of the camera 2 or by receiving a signal generated by the sensor 3. The event occurrence determination unit 22 includes a cumulative representative value calculation unit 221 configured to calculate a representative value by accumulating values that are normally input, a comparison unit 222 configured to compare a newly received value to the calculated cumulative representative value to determine whether an event has occurred, and an exception determination unit 223 configured to determine whether the event is an event with no distinctiveness such as an event occurring regularly and repeatedly.

First, the cumulative representative value calculation unit 221 receives images, sounds, or other signals from the sensor 3 or the imaging unit 21 of the camera 2 while data is being built. Then, the cumulative representative value calculation unit 221 calculates a representative value by accumulating values that are input normally. For example, various sounds generated nearby are received for about one week after a sound detection sensor is installed. Also, the cumulative representative value calculation unit 221 accumulates the volumes of the received sounds to calculate a mean value.

The mean value may be calculated using various calculation methods for calculating a mean such as the arithmetic mean, the geometric mean, and the harmonic mean. In the above example, the mean value has been described as the representative value, but the present invention is not limited thereto. Various representative values such as a mode value and a median value may be used.

The data construction period is a period in which values input normally are received. In the above example, approximately one week is set as the data construction period, but the present invention is not limited thereto. Various values may be set as the data construction period. The data construction period may be a period having an ending point not fixed but corresponding to the current time point changing over time. Accordingly, whenever a new value is received, the comparison unit 222 compares the new value to the cumulative representative value, and also the cumulative representative value calculation unit 221 reflects the new value to the cumulative representative value to update the cumulative representative value in real time. When a specific period, such as one week, is determined as the data construction period in the above example, the ending point is the current time point, and the starting point is a time point earlier than the ending point by a specific period. However, when the starting point of the data construction period is determined to be a specific time point, the data construction period is a period from the specific time point to the current time point. That is, when one of the data construction period and the starting point is fixed, the other changes variously. However, the present invention is not limited thereto, and the data construction period may be formed in various ways, for example, all of the starting point, the ending point, and the period may be fixed.

The cumulative representative value calculation unit 221 may calculate the cumulative representative value in different ways depending on specific time periods. For example, when there is a construction site nearby, a loud noise is made. However, when most sounds at the nearby construction site are generated from 9 a.m. to 5 p.m., the cumulative representative value calculation unit 221 may form different criterion on the basis of statistics data accumulated during the data construction period, i.e., the cumulative representative value calculation unit 221 may calculate a first cumulative representative value from 9 a.m. to 5 p.m. and calculate second cumulative representative value during the other times.

The comparison unit 222 compares a newly received value to the calculated cumulative representative value to determine whether an event has occurred. In the above example, when the calculated cumulative representative value is pre-stored and any sound is generated, the comparison unit 222 compares the volume of a newly received sound to the cumulative representative value. Also, the comparison unit 222 determines that a sound event has occurred when the volume of the sound is greater than the cumulative representative value and determines that no sound event has occurred when the volume of the sound is less than the cumulative representative value.

The exception determination unit 223 determines whether the event is a predictable event such as an event occurring regularly and repeatedly. For example, since the sound of a cuckoo clock is greater than the cumulative representative value that is normally accumulated, the comparison unit 222 determines that an event has occurred. However, a cuckoo clock sounds an alarm a corresponding number of times every hour on the hour. The exception determination unit 223 may predict the sound of the cuckoo clock made every hour on the hour on the basis of the statistics data accumulated during the data construction period. Thus, the exception determination unit 223 determines that this is not an event.

The exception determination unit 223 does not determine whether the event is predictable only based on regularity. For example, when there is a construction site nearby, a loud noise is made. However, when a glass cup placed on a table falls down to a hard floor and breaks, a sound having a waveform different from that of the sound generated at the construction site is generated. In this case, although the volume of the generated sound is not greater than the cumulative representative value, the exception determination unit 223 determines that an event has not occurred with respect to the sound generated at the construction site and determines that an event has occurred with respect to the sound generated when the glass cup breaks.

In the above example, a sound event has been described. However, for a motion event, the representative value may be calculated by accumulating pixel values of images, and the amount of change may be determined. That is, the event occurrence determination unit 22 is not limited thereto and may determine whether various kinds of events have occurred.

Figure 26:
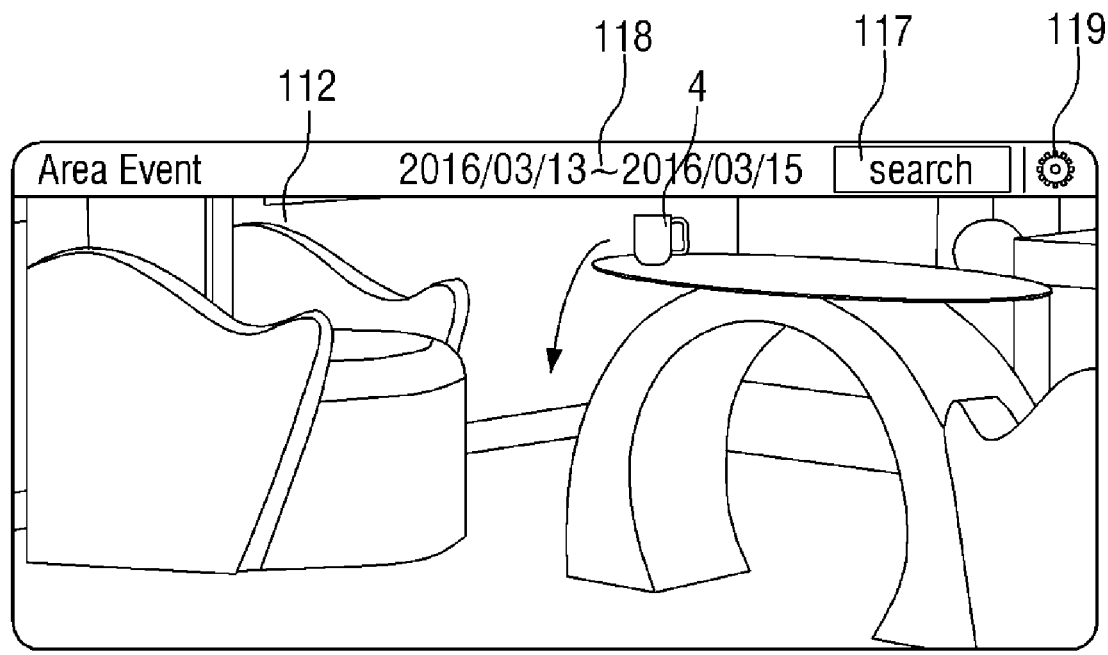
FIG. 26 is a view showing an example in which an event occurs in an image 112 acquired by the camera 2 according to an embodiment of the present invention.
Figures 27, 28:
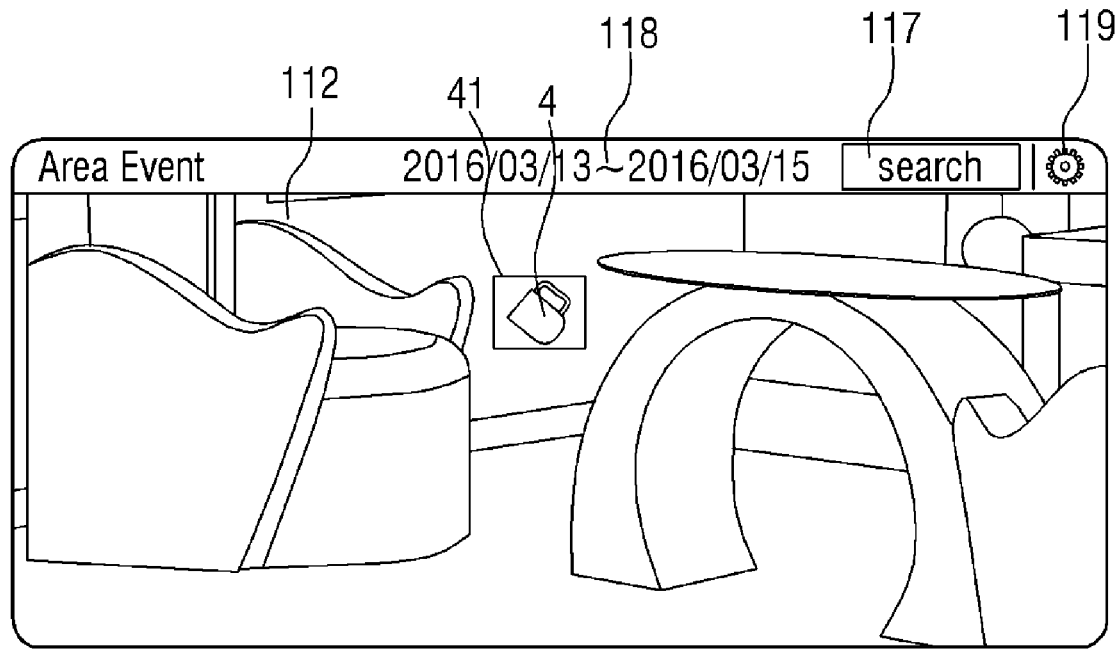
FIG. 27 is a view showing an example of identifying an object 4 that generates a motion event shown in FIG. 26.
FIG. 28 is an example view of metadata 5 generated when a motion event occurs according to an embodiment of the present invention.

FIG. 26 is a view showing an example in which an event occurs in an image 112 acquired by the camera 2 according to an embodiment of the present invention, and FIG. 27 is a view showing an example of identifying an object 4 that generates a motion event shown in FIG. 26.

When an event occurs while the camera 2 is capturing a specific area, the event occurrence determination unit 22 determines an occurrence of an event. For example, as shown in FIG. 26, it is assumed that a glass cup placed on a table falls down. First, the above example will be described as a motion event having occurred.

The imaging unit 21 of the camera 2 captures an area near the table to acquire an image 112. When a change in pixel value within a frame of the image 112 occurs due to a motion of an object 4, which is the glass cup, the event occurrence determination unit 22 recognizes the occurrence of the event. Also, as shown in FIG. 27, the event occurrence determination unit 22 identifies the object 4, which causes an occurrence of a motion event.

When the event occurrence determination unit 22 identifies the object 4, the object 4 is surrounded by a window 41 in the image 112 as shown in FIG. 27. The window 41 is formed as a single closed line to surround the object 4 in the image 112. As shown in FIG. 27, the window 41 may be quadrangular.

FIG. 28 is an example view of metadata 5 generated when a motion event occurs according to an embodiment of the present invention.

When an event occurs as described above, the metadata generation unit 23 generates metadata 5 by using information regarding the event. Metadata is data regarding description of specific data and summarization of types in order to facilitate a search for the specific data. In this case, when the specific data is data that has a large size and is not easy to search for, such as music or video, the metadata 5 is made up of a character string and thus is very small and easy to search for.

As shown in FIG. 28, the metadata 5 includes information regarding the unique ID of the identified object 4, the number of objects 4 identified, the location of the object 4, and an event occurrence time. In detail, as shown in FIG. 28, "utc" indicates information regarding a time at which an event has occurred, "numObj" indicates the number of objects 4 identified, and "event.type" indicates the type of an event having occurred. For example, "event.type" may be represented as a number. For example, the number may be 1 when the event having occurred is a motion event and 2 when the event having occurred is a sound event. Also, "obj[0].left," "right," "top," "bottom," and the like indicate coordinate information for the location of the object 4, that is, the locations of vertices of the window 41 surrounding the object 4. Also, "obj[0].objID" is an ID indicating the unique identifier of the object 4. Even when one object 4 moves or disappears for a moment and then reappears, the camera 2 identifies the object 4 as being the same as before and assigns the same ID to the object 4. However, when one object 4 disappears and then another object 4 appears, the camera 2 identifies the appearing object 4 as being different from the disappearing object 4 and thus assigns a new ID to the appearing object 4. Accordingly, the event search device 1 may easily track a specific object 4.

Figure 29:
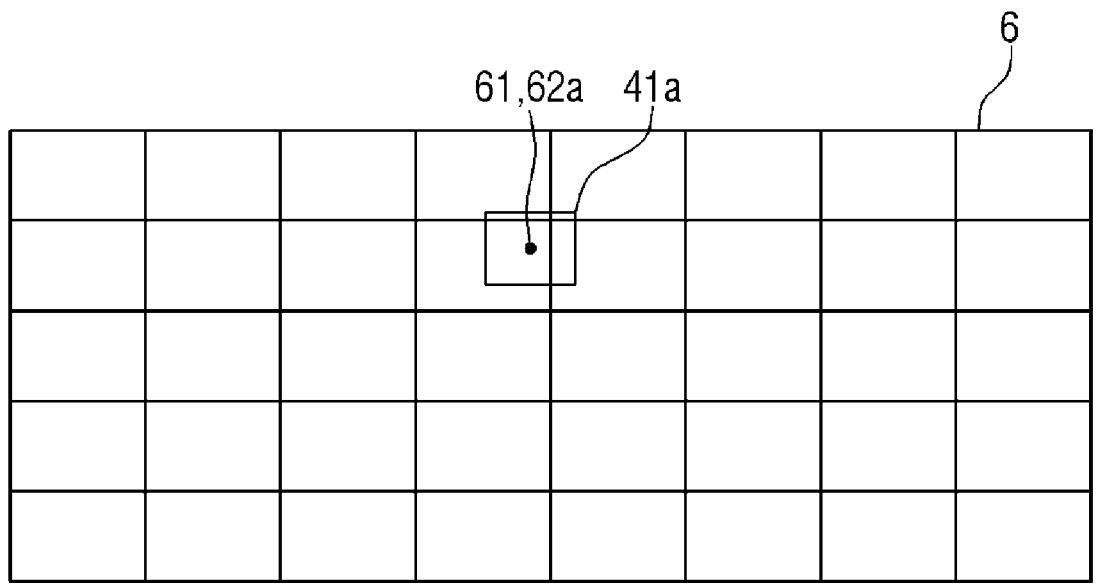
FIG. 29 is a conceptual view showing an example of setting a timestamp 61 and a flag 62 at a point on a search map 6 corresponding to a point where a motion event shown in FIG. 27 has occurred according to an embodiment of the present invention.

FIG. 29 is a conceptual view showing an example of setting a timestamp 61 and a flag 62 at a point on a search map 6 corresponding to a point where a motion event shown in FIG. 27 has occurred according to an embodiment of the present invention.

The metadata 5 according to an embodiment of the present invention is generated when an event occurs. When no event occurs, the metadata 5 has no information, and thus there is no need to generate the metadata 5. Accordingly, in a normal situation, the camera 2 transmits only image data to the event search device 1. However, when an event occurs, the camera 2 transmits the metadata 5, as well as the image data, to the event search device 1.

When the event search device 1 receives the metadata 5 from the camera 2, the search map generation unit 144 recognizes the fact that the metadata 5 is transmitted and checks whether a search map 6 is already generated and stored in the storage unit 13. When the search map 6 is stored, there is no need to generate the search map 6. On the other hand, when no search map 6 is stored, the search map generation unit 144 generates a new search map 6 such that the search map 6 is correspondingly mapped to an image 112 in which the event has occurred.

The metadata analysis unit 143 analyzes the transmitted metadata 5 and transmits information included in the metadata 5 to the timestamp and flag setting unit 145. Also, on the basis of the information, the timestamp and flag setting unit 145 sets a timestamp 61 and a flag 62 at a point on the generated search map 6 corresponding to a point in the image 112 where the event has occurred. The two points need not correspond to each other exactly. However, the timestamp 61 and the flag 62 may be set as being included in at least one block corresponding to the point where the event has occurred among a plurality of blocks formed in the search map 6.

A timestamp 61 refers to an indication that indicates a specific time at which any data is generated or changed. Also, a flag 62 refers to an indication that is used to identify whether a specific state is established, or to leave a promised signal. According to an embodiment of the present invention, the flag 62 indicates the type of an event having occurred. That is, by means of the flag 62, whether the event having occurred is a motion event or a sound event may be determined.

As shown in FIG. 29, when the timestamp 61 and the flag 62 are set, the timestamp 61 and the flag 62 are displayed on the search map 6 using points. When the event having occurred is a motion event and the timestamp 61 and the flag 62 are displayed on the search map 6, the window 41 surrounding the object 4 in the image 112 is assumed as being displayed on the search map 6 as well. Here, the first flag 62a refers to a flag 62 indicating that the type of the event is a motion event. A center of the window 41a, which is assumed as being displayed on the search map 6, is determined as a point where the timestamp 61 and the first flag 62a are to be set. Accordingly, when the glass cup placed on the table falls down as shown in the above example, the timestamp 61 and the first flag 62a are set at a central point of the window 41a on the search map 6 corresponding to the window 41 surrounding the glass cup, as shown in FIG. 27. However, the present invention is not limited thereto, and the timestamp 61 and the first flag 62a may be set at various points. For example, the timestamp 61 may be set at one of the fourth vertices of the window 41.

The timestamp 61 and the flag 62 have different roles, but are displayed at the same point on the search map 6. Accordingly, as shown in FIG. 29, only one indication is shown as being set on the search map 6.

The timestamp 61 itself contains only information regarding the event occurrence time. The flag 62 itself contains only information regarding the type of event. However, coordinates at which the timestamp 61 and the flag 62 are set on the search map 6 indicate an event occurrence location. As a result, it is possible to discover the type of event, an event occurrence time, and an event occurrence location all by means of the timestamp 61 and the flag 62.

Figure 30:
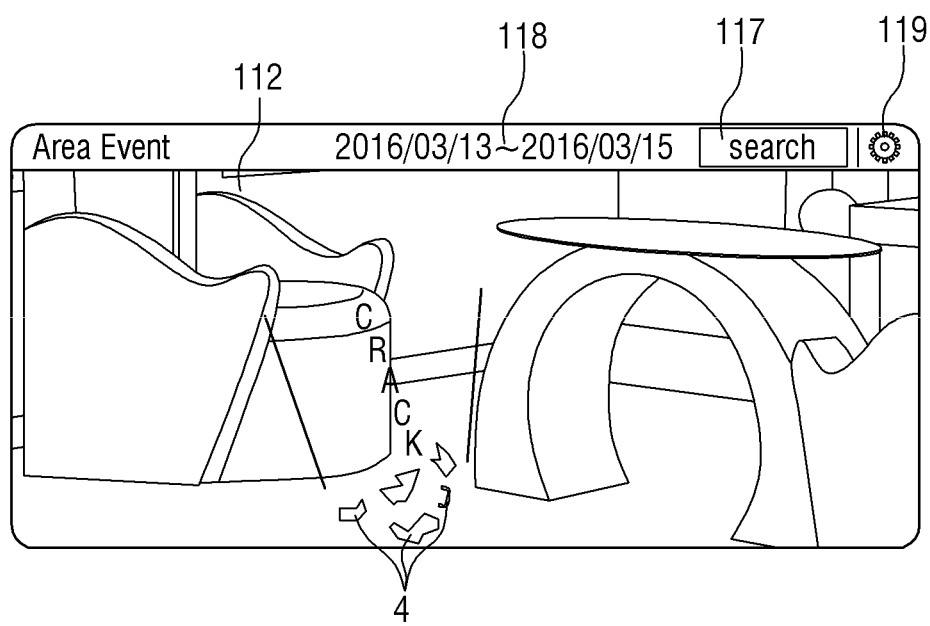
FIG. 30 is a view showing an example in which the event shown in FIG. 26 proceeds with time.
Figure 31:
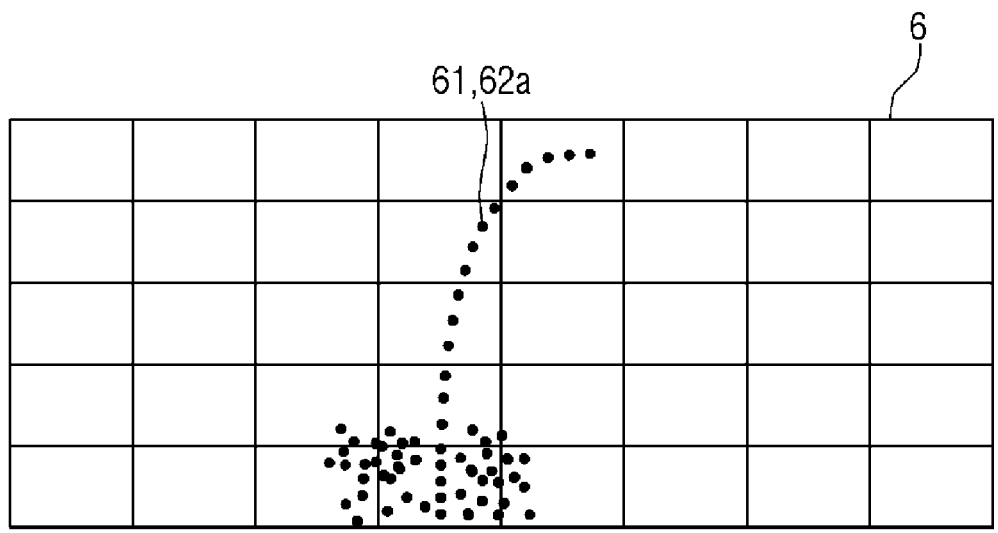
FIG. 31 is a conceptual view showing an example of setting a timestamp 61 and a first flag 62a at a point on the search map 6 corresponding to a point where the motion event shown in FIG. 26 changes according to an embodiment of the present invention.

FIG. 30 is a view showing an example in which the event shown in FIG. 26 proceeds with time, and FIG. 31 is a conceptual view showing an example of setting a timestamp 61 and a first flag 62a at a point on the search map 6 corresponding to a point where the motion event shown in FIG. 26 changes according to an embodiment of the present invention.

When the object 4 keeps moving after the motion event occurs, the occurrence of the motion event proceeds with time. In the above example, until the glass cup placed on the table falls down to a floor and breaks, the occurrence of the motion event may continue proceeding.

In this case, the metadata 5 is generated a certain number of times per hour. Also, the metadata 5 includes location coordinates of the object 4 and an event occurrence time that change as the motion event proceeds.

When the event search device 1 receives a plurality of pieces of metadata 5 from the camera 2 and the metadata analysis unit 143 analyzes the plurality of pieces of metadata 5, the timestamp and flag setting unit 145 sets a plurality of timestamps 61 and a plurality of first flags 62a on the search map 6 on the basis of information included in the metadata 5, as shown in FIG. 31. In this case, the plurality of timestamps 61 and the plurality of first flags 62*a* are set at points corresponding to the changing location coordinates of the object 4. The timestamp 61 and the first flag 62*a* may be set at the same speed as that at which the metadata 5 is generated. For example, when the metadata 5 is generated ten times per second, the timestamp 61 and the first flag 62*a* are also set on the search map 6 ten times per second.

As the speed at which the timestamp 61 and the flag 62 are set increases, the number of timestamps 61 and the number of flags 62 to be set on the search map 6 increase. Accordingly, when an event search is performed later, the speed may decrease. However, as events continuously occur, an interval between the timestamp 61 and the flag 62 decreases. Accordingly, how a process, in which events have occurred, proceeds may be displayed on the search map 6 in detail.

On the other hand, as the speed at which the timestamp 61 and the flag 62 are set decreases, the number of timestamps 61 and the number of flags 62 to be set on the search map 6 increase. Accordingly, when an event search is performed later, the speed may increase. However, since the interval between the timestamp 61 and the flag 62 increases, how the process, in which events have occurred, proceeds cannot be displayed on the search map 6 in detail. Accordingly, the speed at which the timestamp 61 and the flag 62 are set may be changed in various ways depending on performance and ambient environments of the event search device 1.

The search map 6, on which the timestamp 61 and the flag 62 are set, is stored in the storage unit 13 and loaded whenever the metadata 5 is transmitted. Thus, the timestamp 61 is newly set and updated.

Even when a sound event occurs, the event occurrence determination unit 22 determines an event occurrence. In the above example, when the event having occurred is a sound event, a sound may be generated, as shown in FIG. 30 when a glass cup placed on a table falls down to a floor and breaks. When the event occurrence determination unit 22 determines the occurrence of the sound event, the metadata generation unit 23 generates metadata 5 using information regarding the event.

Figure 32:
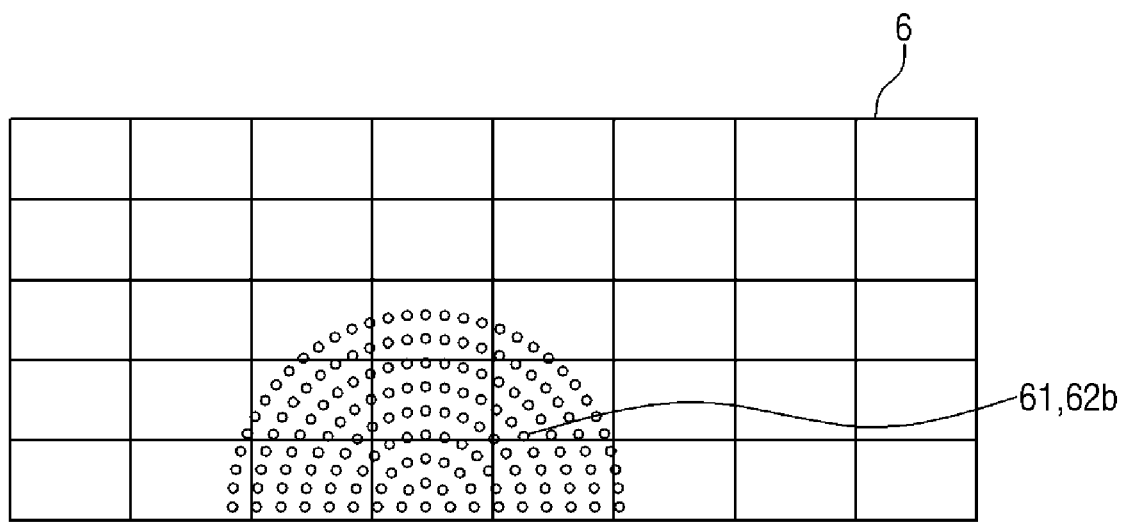
FIG. 32 is a conceptual view showing an example of setting a timestamp 61 and a second flag 62b at a point on the search map 6 corresponding to a point where a sound event shown in FIG. 30 changes according to an embodiment of the present invention.

FIG. 32 is a conceptual view showing an example of setting a timestamp 61 and a second flag 62*b* at a point on the search map 6 corresponding to a point where a sound event shown in FIG. 30 changes according to an embodiment of the present invention.

First, the location of a sound source for generating sounds should be discovered, unlike a motion event, in order to generate the metadata 5 using information regarding a sound event. However, like a motion event, it is difficult to discover the location of the sound source through only image analysis. Therefore, another method may be used instead of the image analysis method. For example, when a specific sound is generated after a plurality of sound detection sensors are installed apart from each other, times at which the plurality of sound detection sensors detect the sound, the volumes of the sound which are detected by the plurality of sound detection sensors, and the like are analyzed. The location of the sound source is closer to a sound detection sensor that has detected a high volume of sound than to a sound detection sensor that has detected a low volume of sound. Also, the location of the sound source is closer to a sound detection sensor that has detected the sound more quickly than to a sound detection sensor that has detected the sound more slowly. On the basis of such a principle, it is possible to discover the location of the sound source in consideration of the speed of the sound, the distance between the sound detection sensors, and the like. Also, as the number of sound detection sensors increases, it is possible to more accurately discover the location of the sound source. However, the present invention is not limited thereto, and various methods may be used as long as the location of the sound source which generates sounds can be discovered.

When the metadata 5 is generated using information regarding the sound event, the metadata generation unit 23 cannot identify an object 4, and thus there is no need for the number of objects 4, the unique IDs of the objects 4, and the like. Also, since there is no window 41 surrounding the object 4, location coordinates of the object 4 are not included. However, the number of sound sources that generate sounds, the location coordinates of the sound sources, and the like are included. Also, the time at which the sound of the sound source is detected by each sound detection sensor and the volume of the sound of the sound source which is detected by each sound detection sensor are included. Also, an ID may even be assigned to the sound having been generated. The waveforms of the frequency, rhythm, etc. of the sound are analyzed. In this case, when the same sound as that having been generated once is generated again in several seconds, the same ID is assigned to the sound. Also, "event.type" indicating the type of event may be displayed as 2. However, the present invention is not limited thereto, and the metadata 5 may include various kinds of information regarding the event which has occurred.

When the event search device 1 receives the metadata 5 from the camera 2, the metadata analysis unit 143 analyzes the received metadata 5 and transmits information included in the metadata 5 to the timestamp and flag setting unit 145. Also, on the basis of the information, the timestamp and flag setting unit 145 sets a timestamp 61 and a second flag 62*b* at a point on the search map 6 corresponding to location coordinates at which the sound event has occurred. Here, the second flag 62*b* refers to a flag 62 indicating that the type of the event is a sound event.

When the sound event occurs, the sound spreads from the sound source at a certain wavelength in all directions by means of air or water. Accordingly, in the above example, a loud sound, such as a sound generated while a glass cup breaks, spreads easily. It may be meaningless to set the timestamp 61 and the second flag 62*b* at every point where the wave of sound generated from the sound source is transferred. When a user performs an event search by specifying a location condition, a result of the event search is derived using information of location coordinates at which the event has occurred. However, when the sound event is determined as having occurred at location coordinates of almost all points on the image 112, there is no difference between a case in which the user specifies the location condition and a case in which the user does not specify the location condition.

On the other hand, when the user sets the timestamp 61 and the second flag 62*b* only at the point corresponding to the location coordinates of the sound source included in the metadata 5 as in the case of the motion event, it would be very difficult for the user to enter the location condition used to search for the event. In the case of a sound event, unlike a motion event, it is assumed that a user is absent from the site when an event occurs. In this case, when an event search is later performed, it is often difficult to discover exactly where the event has occurred.

Accordingly, unlike in the case of the motion event, the event occurrence determination unit 22 should determine a range in which the timestamp 61 and the second flag 62*b* are to be set on the basis of the location coordinates of the sound source included in the metadata 5. The above range is limited to a specific distance that is spaced apart from the location of the sound source in all three-dimensional directions. Accordingly, all points determined through the limitation are connected to one another to form the entirety of or a portion of a sphere with the location of the sound source as a center and the specific distance as a radius.

Here, the specific distance is a factor for determining whether or not a sound event that has occurred is derived as a search result when a user specifies the location condition to perform a search. When the specific distance is too long, there is no difference between a case in which the user specifies the location condition and a case in which a user does not specify the location condition, as described above. On the other hand, when the specific distance is too short, a search result is derived only when a user specifies, as the location condition, a location closest to the sound source. Thus, entering the location condition becomes very complicated. Accordingly, the specific distance may be determined in consideration of a user's intention or an environment using the event search device according to an embodiment of the present invention.

Figure 33:
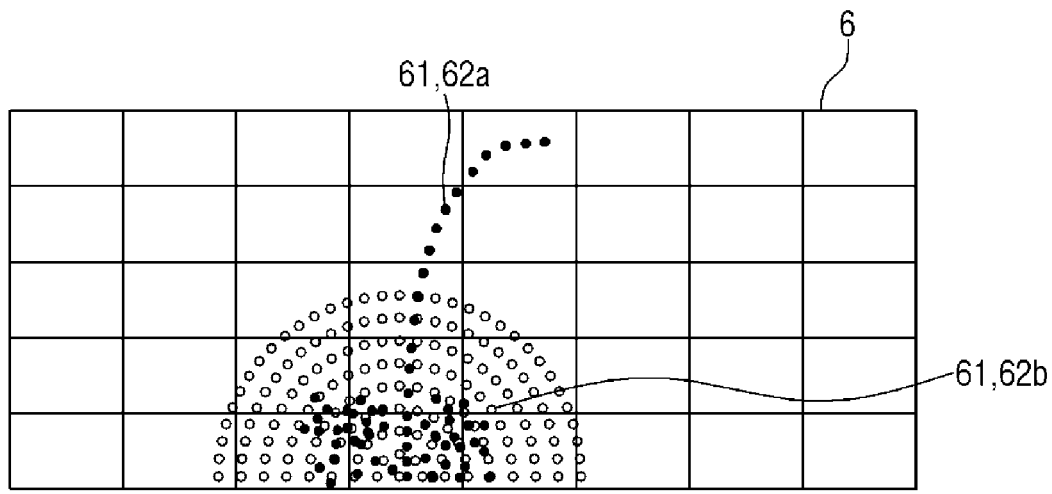
FIG. 33 is a conceptual view showing an example of setting the timestamp 61, the first flag 62a, and the second flag 62b shown in FIGS. 31 and 32 on a single search map 6.

FIG. 33 is a conceptual view showing an example of setting the timestamp 61, the first flag 62a, and the second flag 62b shown in FIGS. 31 and 32 on a single search map 6.

The search map 6 is a virtual space for easily searching for an event by setting the timestamp 61 and the flag 62. Also, the type of event may be identified through the flag 62. Accordingly, it is not necessary to separately generate the search map 6 according to the type of event. That is, as shown in FIG. 33, regardless of the type of event, the timestamp 61 and the flag 62 may be set on the single search map 6 immediately when an event occurs.

Therefore, when a glass cup placed on a table falls down as in the above example, a motion event occurs along with a sound event. Accordingly, the timestamp 61 and the first flag 62a are set at a point corresponding to location coordinates of an object 4 changing as the object 4 moves, and the timestamp 61 and the second flag 62b are set within a range which is separated a specific distance from the location coordinates of the sound source.

Figure 34:
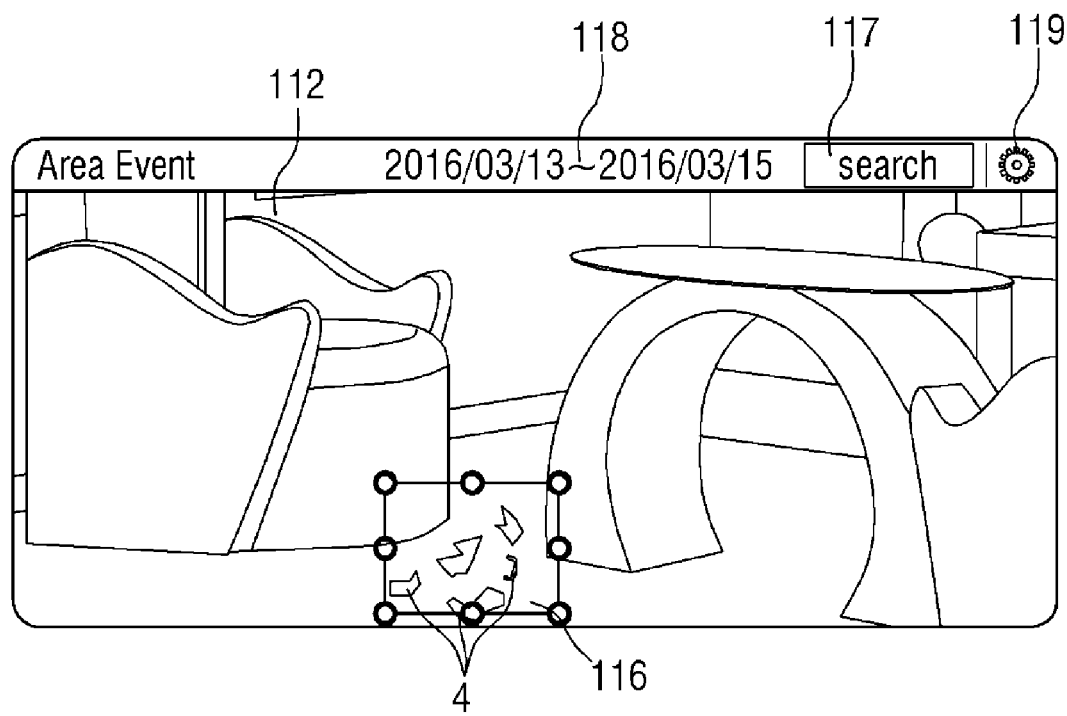
FIG. 34 is a view showing an example of setting an event search area at a location to be searched on an image according to an embodiment of the present invention.
Figure 35:
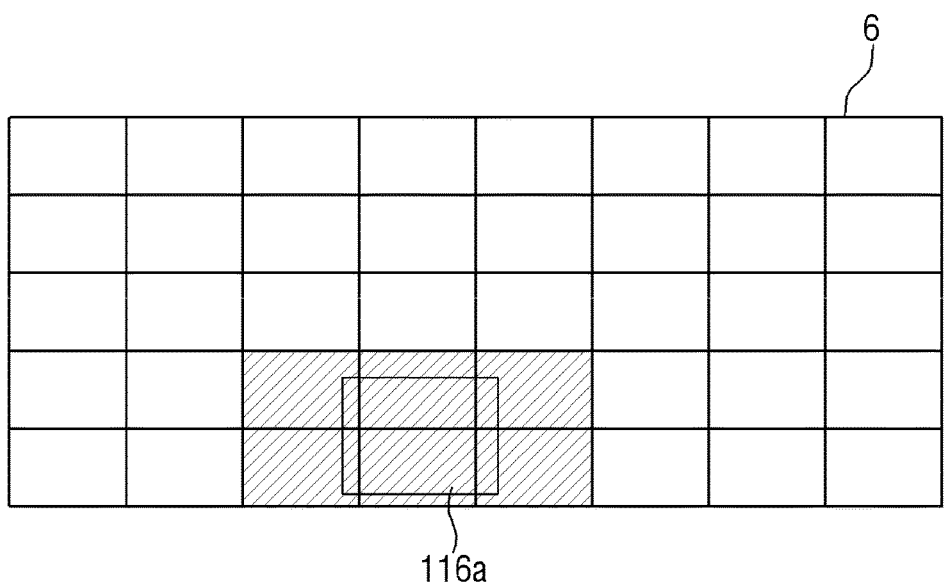
FIG. 35 is a conceptual view showing an example of specifying an area corresponding to the event search area of FIG. 34 on the search map 6 according to an embodiment of the present invention.

FIG. 34 is a view showing an example of setting an event search area at a location to be searched on an image according to an embodiment of the present invention, and FIG. 35 is a conceptual view showing an example of specifying an area corresponding to the event search area of FIG. 34 on the search map 6 according to an embodiment of the present invention.

In order for a user to perform an event search, the location condition is specified through a UI of the event search device. Also, the method of specifying the location condition has been described above with reference to FIGS. 8 to 22. That is, the user sets an event search area at a location to be searched on an image, as shown in FIG. 34.

When an event search area 116 is specified on the image 112, an event search area 116a is displayed on a search map 6, as shown in FIG. 35. As described above, the search map 6 is divided into a plurality of blocks having a certain size. Also, when a timestamp 61 and a flag 62 are present inside the blocks, each of which includes the event search area 116a, the data search unit 146 performs a search.

It will be understood by those skilled in the art that various changes in form and details may be made without departing from the spirit and scope of the present invention as defined by the appended claims. The above embodiments are accordingly to be regarded as illustrative rather than restrictive. Therefore, the scope of the present invention is defined not by the detailed description but by the following claims, and all changes or modifications within the claims and their equivalents will be construed as being included in the scope of the present invention.

What is claimed is:

1. An event search system comprising:
a sensor configured to detect an occurrence of an event and generate a signal;
a camera, in response to receiving the signal from the sensor, configured to generate a plurality of image frames of a surveillance area and metadata of the image frames, the metadata comprising time information of the occurrence of the event and location information of the event in the plurality of image frames; and
an event search device configured to receive the plurality of image frames and the metadata from the camera and search for an event, and the event search device comprising:
at least one processor;
a non-transitory computer readable medium connected to the processor and storing machine readable instructions that when executed by the at least one processor, cause the at least one processor to:
receive the plurality of image frames and the metadata;
receive a search condition for searching for the event, the search condition comprising an event search area;
display the event search area on the image frames;
search for the event, the search condition comprising an event search area and search for the event satisfying the search condition within the event search area by using the metadata; and
generate a search map consisting of a plurality of blocks, and set timestamps of the event on the same search map regardless of a type of the event when the event occurs, the type of the event including a motion event and a sound event; and
a screen configured to display the event search area on the image frames,
wherein at least one of a location, a size, and a shape of the event search area is defined by a user,
wherein the event search area has a polygon shape, a plurality of joints being linearly connected to one another to form a single closed line of the polygon shape, and
wherein when the user drags a joint from the plurality of joints, the joint moves from one point to another point and the dragged point is fixed at a point where the user's touch is released, such that the event search area changes in shape.

2. The event search system of claim 1, wherein the instructions are further configured to cause the at least one processor of the event search device to:
generate the search map having an aspect ratio corresponding to the image frames;
set a timestamp and a flag in a corresponding block among the plurality of blocks of the search map based on the location information; and
search for the timestamp and the flag set in a block among the plurality of blocks corresponding to the search location and configured to search for the event based on the metadata of an image frame corresponding to the searched timestamp and the searched flag.

3. The event search system of claim 2,
wherein the timestamp comprises information regarding a time of the occurrence of the event, and wherein the flag comprises information regarding a type of the event.

4. The event search system of claim 2,
wherein the metadata further comprises an identifier of an object triggering the event,
wherein the search condition comprises a location condition of the event, and
wherein the location information is a two-dimensional coordinates of the object in the search map.

5. The event search system of claim 1, wherein the camera comprises:
at least one camera processor; and
a non-transitory computer readable medium connected to the at least one processor and storing machine readable instructions that when executed by at least one camera processor, cause the at least one camera processor to:
capture and generate a plurality of image frames of the surveillance area;
determine whether the event has occurred based on the image frames or the signal generated by the sensor;
generate the metadata, which comprises the occurrence time information and the location information of the event; and
transmit the plurality of image frames and the metadata to the event search device.

6. The event search system of claim 5, wherein the instructions are further to cause the at least one camera processor to:
calculate a cumulative representative value by accumulating values of the signal from the sensor or the plurality of image frames, for a data construction period;
compare a new value of the signal or the plurality of image frames received after the data construction period to the cumulative representative value to determine whether the event has occurred; and
determine whether the event is an event with no distinctiveness.

7. The event search system of claim 6, wherein the instructions are further to cause the at least one camera processor to determine that the event has occurred in response to the new value being greater than the cumulative representative value, and configured to determine that the event has not occurred in response to the new value not being greater than the cumulative representative value.

8. An event search device comprising:
a display screen;
at least one processor; and
a non-transitory computer readable medium connected to the at least one processor and storing machine readable instructions that when executed by at least one processor, cause the at least one processor to:
receive, from a camera, a plurality of image frames of a surveillance area generated in response to an occurrence of an event, and metadata comprising time information of the occurrence of the event and location information of an event in the image frames;
receive a search condition for searching for the event, the search condition comprising an event search area;
display, on the display screen, the event search area on the image frames;
search for an event satisfying the search condition within the event search area by using the metadata; and
generate a search map consisting of a plurality of blocks, and set timestamps of the event on the same search map regardless of a type of the event when the event occurs, the type of the event including a motion event and a sound event;
wherein at least one of a location, a size, and a shape of the event search area is defined by a user,
wherein the event search area has a polygon shape, a plurality of joints being linearly connected to one another to form a single closed line of the polygon shape, and
wherein when the user drags a joint from the plurality of joints, the joint moves from one point to another point and the dragged point is fixed at a point where the user's touch is released, such that the event search area changes in shape.

9. The event search device of claim 8, wherein the instructions are further configured to cause the at least one processor to:
generate the search map having an aspect ratio corresponding to the image frames;
set a timestamp and a flag in a corresponding block among the plurality of blocks of the search map based on the location information; and
search for the timestamp and the flag set in a block among the plurality of blocks corresponding to the search location and configured to search for the event based on the metadata of an image frame corresponding to the searched timestamp and the searched flag.

10. The event search device of claim 9,
wherein the timestamp comprises information regarding a time of the occurrence of the event, and
wherein the flag comprises information regarding a type of the event.

11. The event search device of claim 9,
wherein the metadata further comprises an identifier of an object triggering the event,
wherein the search condition comprises a location condition of the event, and
wherein the location information is a two-dimensional coordinates of the object in the search map.

12. The event search device of claim 8, wherein the camera comprises:
at least one camera processor; and
a non-transitory computer readable medium connected to the at least one camera processor and storing machine readable instructions that when executed by at least one camera processor, cause the at least one camera processor to:
generate a plurality of image frames of the surveillance area;
determine whether the event has occurred based on the image frames or a signal generated by a sensor in response to detecting the occurrence of the event;
generate the metadata, which comprises the occurrence time information and the location information of the event; and
transmit the image frames and the metadata to the event search device.

13. The event search device of claim 12, wherein the instructions are further configured to cause the at least one camera processor:
calculate a cumulative representative value by accumulating values of the signal from the sensor or the image frames, for a data construction period;
compare a new value of the signal or the image frames received after the data construction period to the cumulative representative value to determine whether the event has occurred; and determine whether the event is an event with no distinctiveness.

14. An event search method comprising:
generating a plurality of image frames through an imaging device;
generating metadata comprising time information and location information of an event occurred in the plurality of image frames through the imaging device;
transmitting the plurality of image frames and the metadata to an event search device;
receiving a search condition for searching for the event through the event search device, the search condition comprising an event search area;
displaying the event search area on the image frames on a display of the event search device;
searching for an event satisfying the search condition within the event search area by using the metadata using a controller of the event search device; and
generate a search map consisting of a plurality of blocks, and set timestamps of the event on the same search map regardless of a type of the event when the event occurs, the type of the event including a motion event and a sound event,
wherein the event search area has a polygon shape, a plurality of joints being linearly connected to one another to form a single closed line of the polygon shape, and
wherein when a user drags a joint from the plurality of joints, the joint moves from one point to another point and the dragged point is fixed at a point where the user's touch is released, such that the event search area changes in shape.

15. The event search method of claim 14, wherein the method further comprises:
generating the search map having an aspect ratio corresponding to the image frames;
setting a timestamp and a flag in a corresponding block among the plurality of blocks of the search map based on the location information; and
searching for the timestamp and the flag set in a block among the plurality of blocks corresponding to the search location and configured to search for the event based on the metadata of an image frame corresponding to the searched timestamp and the searched flag.

16. The event search method of claim 15,
wherein the timestamp comprises information regarding a time of the occurrence of the event, and
wherein the flag comprises information regarding a type of the event.

17. The event search method of claim 15,
wherein the metadata further comprises an identifier of an object triggering the event,
wherein the search condition comprises a location condition and a time condition of the event, and
wherein the location information is a two-dimensional coordinates of the object in the search map.

18. The event search method of claim 14, wherein the method further comprises:
capturing and generating a plurality of image frames of the surveillance area;
determining whether the event has occurred based on the image frames or the signal generated by a sensor for detecting an event occurrence;
generating the metadata, which comprises the occurrence time information and the location information of the event; and
transmitting the plurality of image frames and the metadata to the event search device.

19. The event search method of claim 18, wherein the method further comprises:
calculating a cumulative representative value by accumulating values of the signal from the sensor or the image frames, for a data construction period;
comparing a new value of the signal or the plurality of image frames received after the data construction period to the cumulative representative value to determine whether the event has occurred; and
determining whether the event is an event with no distinctiveness.

20. The event search method of claim 19, wherein the method further comprises determining that the event has occurred in response to the new value being greater than the cumulative representative value and configured to determine that the event has not occurred in response to the newly received value not being greater than the cumulative representative value.

* * * * *